United States Patent
Rimini et al.

(10) Patent No.: US 8,767,869 B2
(45) Date of Patent: Jul. 1, 2014

(54) JOINT LINEAR AND NON-LINEAR CANCELLATION OF TRANSMIT SELF-JAMMING INTERFERENCE

(75) Inventors: Roberto Rimini, San Diego, CA (US); Peter D. Heldmann, Encinitas, CA (US); Prasad S. Gudem, San Diego, CA (US); Sumit Verma, San Diego, CA (US); Joseph Burke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/587,792

(22) Filed: Aug. 16, 2012

(65) Prior Publication Data

US 2013/0044791 A1 Feb. 21, 2013

Related U.S. Application Data

(60) Provisional application No. 61/525,080, filed on Aug. 18, 2011, provisional application No. 61/654,682, filed on Jun. 1, 2012, provisional application No. 61/659,836, filed on Jun. 14, 2012.

(51) Int. Cl.
*H04L 25/03* (2006.01)
*H04L 25/49* (2006.01)
*H04K 1/02* (2006.01)

(52) U.S. Cl.
USPC ........... 375/296; 375/267; 375/295; 375/299; 370/334; 455/101

(58) Field of Classification Search
USPC ................. 375/295, 296, 267, 299; 455/101; 370/334
See application file for complete search history.

(56) References Cited

U.S. PATENT DOCUMENTS

| 6,516,183 | B1 | 2/2003 | Hellmark |
|---|---|---|---|
| 7,043,208 | B2 | 5/2006 | Nigra |
| 2007/0184782 | A1 | 8/2007 | Sahota et al. |
| 2011/0149714 | A1 | 6/2011 | Rimini et al. |

FOREIGN PATENT DOCUMENTS

JP 1129539 A 5/1989

OTHER PUBLICATIONS

Aparin V., et al., "Analysis and Reduction of Cross-Modulation Distortion in CDMA Receivers", IEEE Transactions on Microwave Theory and Techniques, IEEE Service Center, Piscataway, NJ, US, vol. 51, No. 5, pp. 1591-1602, May 1, 2003, XP011077002, ISSN: 0018-9480 the whole document.
International Search Report and Written Opinion—PCT/US2012/051476—ISA/EPO—Dec. 18, 2012.

*Primary Examiner* — Ted Wang
(74) *Attorney, Agent, or Firm* — Patterson & Sheridan, L.L.P.

(57) ABSTRACT

Certain aspects of the present disclosure propose an adaptive joint linear and non-linear digital filter that can adaptively estimate and reconstruct cascaded effects of linear and non-linear self-jamming distortions introduced by non-linearities in the transmit and/or receive chains. The proposed digital filter may be used to cancel second-order inter-modulation distortion (IM2) generated in the receive chain and/or harmonic distortion generated in the transmit chain, as well as other distortions introduced by the transmit/and or receive chains.

40 Claims, 16 Drawing Sheets

JOINT LINEAR AND NON-LINEAR CANCELLATION OF TRANSMIT SELF-JAMMING INTERFERENCE

The present Application for Patent claims priority to U.S. Provisional Application No. 61/525,080, entitled "Enhanced Volterra Filter for Joint Linear and Non-Linear Cancellation of Transmit Self-Jamming Interference," filed Aug. 18, 2011, and U. S. Provisional Application No. 61/654,682, entitled "Enhanced Volterra Filter for Joint Linear and Non-Linear Cancellation of Transmit Self-Jamming Interference," filed Jun. 1, 2012, and U. S. Provisional Application No. 61/659,836, entitled "Joint Linear and Non-Linear Cancellation of Transmit Self-Jamming Interference," filed Jun. 14, 2012, all of which are assigned to the assignee hereof and hereby expressly incorporated by reference herein.

TECHNICAL FIELD

Certain embodiments of the present disclosure generally relate to wireless communications and, more particularly, to cancelling self-jamming interference in a transceiver.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system may support time division duplex (TDD) and/or frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station. In an FDD system, forward and reverse link transmissions are on different frequency regions.

In a FDD transceiver, the strongest interference on a received signal may be caused by self-jamming leakage from a transmit (Tx) signal that is simultaneously transmitted by the transceiver. The Tx signal may leak to the receive path through the finite isolation (e.g., through a duplexer filter, antenna coupling, circuit card electromagnetic interference (EMI), and VLSI chip coupling). Although in a different frequency band, the Tx leakage signal may cause co-channel interference on the intended received signal due to excitations of some non-linear behavior in the Rx. This scenario is referred herein after as self-jamming. Another case of Tx self-jamming arises when non-linearities present in the transmitter chain generate spectral re-growth commonly indicated as harmonics in the receiver band. For example, spectral re-growth may cause second harmonic distortion (H2D), third harmonic distortion (H3D), and distortions generated by higher order harmonics. The co-channel interference may be generated when nonlinearities are excited in the radio frequency (RF) down conversion components: such as low noise amplifier (LNA), mixer, switches, filters, data converters and other like components.

Two of the nonlinearities that are investigated are second-order inter-modulation distortion (IM2) generated in the Rx chain and third harmonic distortion (H3D) generated in the transmit chain. The problem of transmit signal leakage and subsequent potential IM2 and H3 distortion in a frequency band may be addressed in different ways. A predominant type of solution utilizes analog RF approach which detects presence of an adjacent jammer and increases the current drawn in the mixer to improve linearity. Obviously, this approach results in higher power consumption and hence reduces talk-time of a wireless device. In certain scenarios existing analog solutions may not be enough to keep non-linear distortion signals from negatively impacting the receiver performance. For mitigation of harmonics (e.g., H2D, H3D and other harmonics falling in the receiver band) a high rejection analog filter may be used at the output of the power amplifier (PA). However, this approach results in increased insertion loss, which negatively impacts PA efficiency (e.g., excess current is drawn from the battery). Furthermore, this filter is harmless with respect to coupling mechanism inside the board. In both of these example scenarios an improved solution is desirable.

SUMMARY

Certain aspects of the present disclosure provide a method for reducing the effects of self-jamming leakage for wired and wireless communications. The method generally includes generating a signal to be transmitted on a first frequency band, transmitting the generated signal on the first frequency band, computing an estimated distorted version of the generated signal by applying an adaptive joint linear and non-linear digital filter to the generated signal at baseband, receiving a composite signal on at least a second frequency band, the composite signal comprising a desired signal and self-jamming interference, wherein the self-jamming interference is caused by a cascaded effect of at least one of non-linear or linear distortions introduced by at least one of transmit or receive chain non-idealities, and subtracting the estimated distorted version of the generated signal from the composite signal to remove the self-jamming interference.

Certain aspects of the present disclosure provide an apparatus for reducing the effects of self-jamming leakage for wired and wireless communications. The apparatus generally includes means for generating a signal to be transmitted on a first frequency band, means for transmitting the generated signal on the first frequency band, means for computing an estimated distorted version of the generated signal by applying an adaptive joint linear and non-linear digital filter to the generated signal at baseband, means for receiving a composite signal on at least a second frequency band, the composite signal comprising a desired signal and self-jamming interference, wherein the self-jamming interference is caused by a cascaded effect of at least one of non-linear or linear distortions introduced by at least one of transmit or receive chain non-idealities, and means for subtracting the estimated distorted version of the generated signal from the composite signal to remove the self-jamming interference.

Certain aspects provide a computer-program product for reducing the effects of self-jamming leakage for wired and wireless communications, comprising a non-transitory computer-readable medium having instructions stored thereon, the instructions being executable by one or more processors. The instructions generally include instructions for generating a signal to be transmitted on a first frequency band, instructions for transmitting the generated signal on the first frequency band, instructions for computing an estimated distorted version of the generated signal by applying an adaptive joint linear and non-linear digital filter to the generated signal at baseband, instructions for receiving a composite signal on at least a second frequency band, the composite signal comprising a desired signal and self-jamming interference, wherein the self-jamming interference is caused by a cascaded effect of at least one of non-linear or linear distortions introduced by at least one of transmit or receive chain non-idealities, and instructions for subtracting the estimated distorted version of the generated signal from the composite signal to remove the self-jamming interference.

Certain aspects of the present disclosure provide an apparatus for reducing the effects of self-jamming leakage for wired and wireless communications. The apparatus generally includes at least one processor and a memory coupled to the at least one processor. The processor is configured to generate a signal to be transmitted on a first frequency band, transmit the generated signal on the first frequency band, compute an estimated distorted version of the generated signal by applying an adaptive joint linear and non-linear digital filter to the generated signal at baseband, receive a composite signal on at least a second frequency band, the composite signal comprising a desired signal and self-jamming interference, wherein the self-jamming interference is caused by a cascaded effect of at least one of non-linear or linear distortions introduced by at least one of transmit or receive chain non-idealities, and subtract the estimated distorted version of the generated signal from the composite signal to remove the self-jamming interference.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
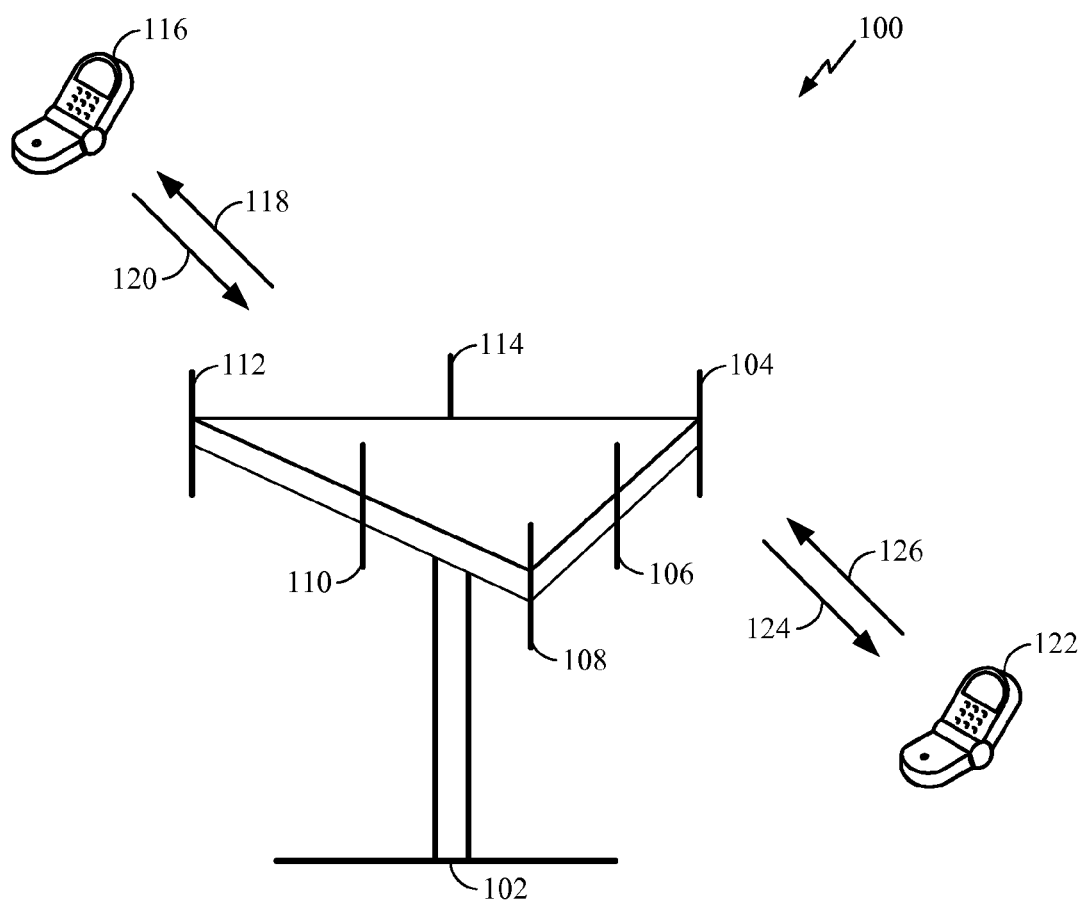
FIG. 1 illustrates a multiple access wireless communication system, in accordance with certain embodiments of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), The Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various applications involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ratio (PAPR) because of its inherent single carrier structure. SC-FDMA may be used in the uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

Referring to FIG. 1, a multiple access wireless communication system 100 according to one aspect is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 118 and receive information from access terminal 116 over reverse link 120. Access terminal 122 is in communication with antennas 104 and 106, where antennas 104 and 106 transmit information to access terminal 122 over forward link 124 and receive information from access terminal 122 over reverse link 126. In a Frequency Division Duplex (FDD) system, communication links 118, 120, 124 and 126 may use a different frequency for communication. For example, forward link 118 may use a different frequency than that used by reverse link 120.

Each group of antennas and/or the area in which they are designed to communicate is often referred to as a sector of the access point. In an aspect, antenna groups each are designed to communicate to access terminals in a sector of the areas covered by access point 102.

In communication over forward links 118 and 124, the transmitting antennas of access point 102 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal, or some other terminology. For certain aspects, either the AP 102 or the access terminals 116, 122 may utilize an interference cancellation technique as described herein to improve performance of the system.

Figure 2:
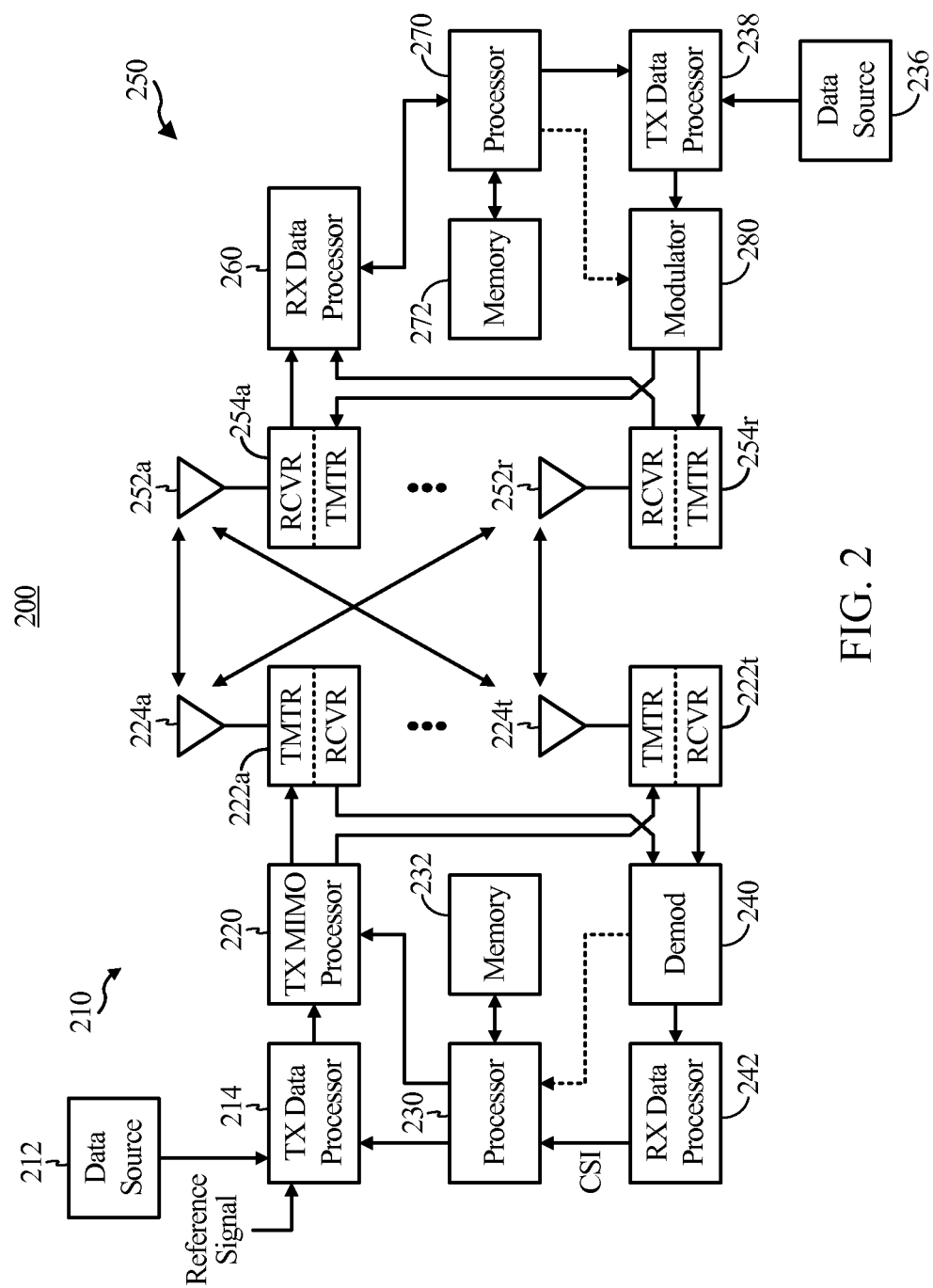
FIG. 2 illustrates a block diagram of a communication system, in accordance with certain embodiments of the present disclosure.

FIG. 2 is a block diagram of an aspect of a transmitter system 210 and a receiver system 250 in a MIMO system 200. At the transmitter system 210, traffic data for a number of data streams is provided from a data source 212 to a transmit (TX) data processor 214. An embodiment of the present disclosure is also applicable to a wireline (wired) equivalent system of FIG. 2

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M may be a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210. As described in further detail below, the RX data processor 260 may utilize interference cancellation to cancel the interference on the received signal.

Processor 270, coupled to a memory 272, formulates a reverse link message. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250.

Jammers may pose stringent requirements on linearity of a transceiver. For a frequency division duplex (FDD) transceiver, the strongest jammer may be represented by its own transmitted signal (Tx). The large transmit-receive power difference may commonly be handled through tight radio frequency (RF) filtering, high linearity/high power consumption RF chains and costly calibration procedures. When linearity requirements can not be met or intentionally traded for area, power and/or cost savings, non-linear effects induced by the transmitter can produce undesired spectral re-growth in the receiver band thus de-sensing the demodulator. This mechanism is referred to as Tx self-jamming.

Certain aspects of the present disclosure present a novel scheme to mitigate Tx self-jamming produced by non-idealities in transmit and/or receive chain. The proposed scheme may mitigate $2^{nd}$ order intermodulation distortion (IM2D) and spectral re-growth distortion (e.g., second harmonic distortion (H2D), third harmonic distortion (H3D) and the like), which are particularly severe for LTE and LTE-A, and coexistence scenario in the same device. A digital non-linear filter based on Volterra series is proposed to adaptively reconstruct and cancel the non-linear Tx induced distortion as observed at the receiver.

Analog devices may exhibit a linear input-output characteristic only for a limited range of input signal levels. When the input signal power exceeds the nominal operating region of the device, the output signal may contain a scaled version of the input (linear term) a well as contributions from higher order harmonics at different frequency than the input signal. This non-linear mechanism, also referred as spectral re-growth, may be responsible for generating interference in other regions of the spectrum. The present disclosure focuses on Tx induced spectral re-growth jamming the receiver band.

The RF front-end devices may be excited by strong out-of-band interference, such as leakage of a transmitted signal in the receive-path through a duplexer. Although the leakage interference may be in a different frequency band, due to its high power level, the interference may excite nonlinearities of an RF front-end stage. As a result, spectral re-growth of the transmitted signal may overlap with the intended received signal which may cause significant signal degradation.

A full duplex transceiver may demodulate a very weak signal (e.g., sensitivity requirement) while transmitting at maximum power. The resultant Tx and Rx power difference may be very large. For example, in CDMA systems maximum transmit power is 24 dBm at antenna and the receive signal level may be as low as −106 dBm. To handle such a large power difference, costly external filters (e.g., duplexers) may be employed to attenuate power of the transmit signal in the receiver frequency band. Due to limited filter rejection (normally around ~50 dB), a consistent residual portion of transmit power may leak in the receiver chain. This Tx leakage may dictate the linearity requirement of the RF down-conversion chain. High linearity transceivers may come at the expense of high current consumption which is a key metric for handheld devices. The high linearity transceivers may also need time-consuming calibration procedures. In a worst-case scenario, when universal optimal settings can not be found, the calibration has to be carried out on each device, thus impacting the efficiency of mass production for a handset manufacturer.

The problem of Tx signal leaking in the receive band may be even more severe in the wireless devices that are in compliance with the LTE standard. Support of radio bands with variable duplexer spacing may pose significant challenges on the design of the front-end filters because for some bands the Tx-Rx frequency separation can be very small, which may result in reduced Tx rejection capability.

Another problematic RF situation may be encountered in LTE-A carrier aggregation (CA) when an Rx carrier frequency is an integer multiple (harmonic) of a Tx carrier frequency. In this case, the receiver carrier frequency can easily be self-jammed by non-linearity that is introduced by the Tx carrier. Similar situation of harmonics jamming may be encountered in multi mode WAN/WLAN/GPS transceivers, in which WAN stands for Wide Area Network, WLAN stands for Wireless Local Area Network, and GPS stands for Global Positioning System.

It should be noted that whether the receiver mixer is operated without calibration for cost savings, or inadequate Tx filter rejection is used (as experienced in some LTE and LTE-A radio configurations), the non-linearity induced by Tx leakage may enter and jam the receiver band. The present disclosure focuses on two types of Tx self-jamming: the IM2D generated in the Rx chain, and the H3D or any other harmonic of the transmitted signal generated in the Tx chain. However, it should be noted that the proposed interference cancellation technique may be used to mitigate other types of self-jamming interferences (e.g., p-order intermodulation interference, $m^{th}$ harmonic distortion (where p and m may be any integer number), and the like) introduced by the transmit and/or receive chains of one or more radio systems, all of which fall within the scope of the present disclosure.

For the IM2D generated in the Rx chain, the cause may be represented by the 2nd order non-linearity of the quadrature down-conversion chain, which may result in undesired spectral re-growth of the Tx signal at direct current (DC) thus de-sensing the Rx signal. For the devices that are in compliance with the LTE standard, the IM2D may be more relevant because it may overlap with the DL synchronization channels (e.g., primary synchronization signal (PSS), secondary synchronization signal (SSS)) that are used for cell search and hand over.

The H3D generated in the Tx chain may, for example, apply to the B17 (710MHz) and B4 (2130 MHz) carrier aggregation configuration. For this scenario, the source of non-linearity may be represented by the 3rd harmonic produced by the front-end stages (e.g., power amplifier (PA) and switch) of the low-band transmitter. The H2D generated in the Tx chain may, for example, apply to carrier aggregation in the B8 and B3 frequency bands as defined in the LTE-A standard. Other possible scenario of inter-system jamming is represented by H2D of B13 WAN transmitter falling in GPS Rx.

Figure 3:
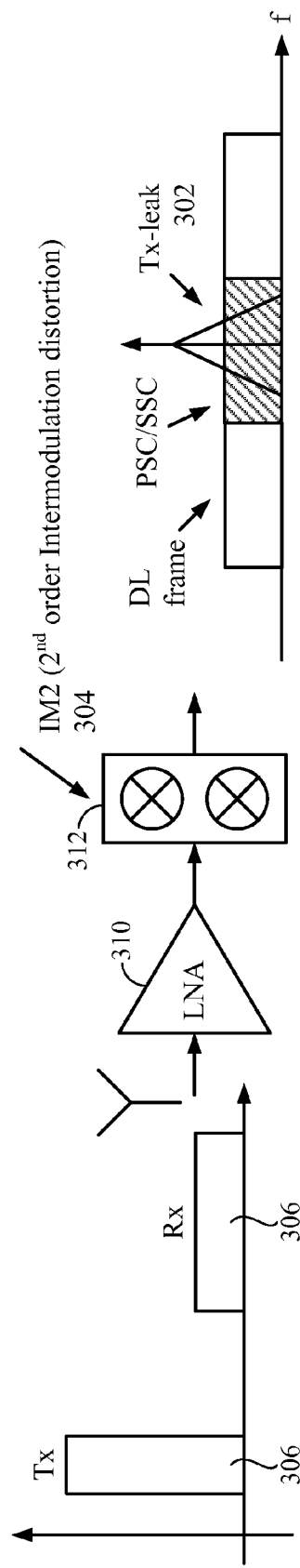
FIG. 3 illustrates an example second order inter-modulation distortion (IM2) effect caused by transmit signal leaking into receiver, in accordance with certain embodiments of the present disclosure.

FIG. 3 illustrates an example second order inter-modulation distortion effect caused by Tx signal leaking into receiver, in accordance with certain embodiments of the present disclosure. As illustrated, a high power signal 306 may be transmitted by a transceiver while a lower power signal 308 may be received through the receiver. The received signal may pass through the low noise amplifier (LNA) 310 and the mixer 312. Base-band down-conversion of transmitter leakage 302 through mixer $2^{nd}$ order non-linearity may fall at direct current (DC) portion of the spectrum, thus de-sensitizing the Zero Intermediate Frequency (ZIF) receiver at low signal to noise ratios (SNRs). For LTE systems, the transmitter leakage may overlap with Primary synchronization code (PSC), secondary synchronization code (SSC) or other base-band signals.

Certain aspects of the present disclosure propose a novel approach entirely based on digital signal processing to mitigate both IM2D and H3D non-linearity effects. The proposed scheme implements a non-linear digital adaptive canceller based on a Volterra filter (e.g., referred to as non-linear interference cancellation (NL-IC) throughout this disclosure). It may be assumed that the jammer under consideration is the transceiver's own Tx signal which is perfectly known at the receiver, or the Tx signal of another system co-located in the same device. The objective of the digital non-linear filter is to faithfully reproduce the same non-linear distortion experienced by the Tx signal in the RF chain using the Tx baseband samples. Prior to modem processing, the reconstructed interference may be subtracted at baseband from the observed Rx signal that is corrupted by the self-jamming distortion.

The proposed NL-IC scheme has several advantages. For example, The proposed NL-IC is fully adaptive. Therefore, it may not need extra analog circuitry or any calibration. The proposed NL-IC scheme is technology agnostic and can be applied to WCDMA, LTE, and other technologies by simply accounting for the different bandwidth and sampling rates. The NL-IC scheme is flexible to handle different Tx self-jamming effects such as IM2D, H3D and other harmonics products such as H2D, H4D and the like. It can be used to facilitate challenging intra-device coexistence scenarios where the aggressor Tx signal (that may be insufficiently attenuated) can induce IM2D at the victim receiver. For example, this is the case for LTE B40 (aggressor) and BT (victim) that are adjacent in frequency spectrum with a minimal guard band. Another relevant co-existence scenario is cellular wide area network (WAN) with wireless local area network (WLAN) transmitter located in the same radio device. It should be noted that many of the WAN frequency bands may have harmonic relation with WLAN frequency bands, such that one of the harmonics (e.g., the H2D, H3D, or the like) of the WAN transmitter falls in the same frequency band used by the WLAN receiver. The proposed interference cancellation scheme may mitigate these co-existence effects as well.

Figure 4:
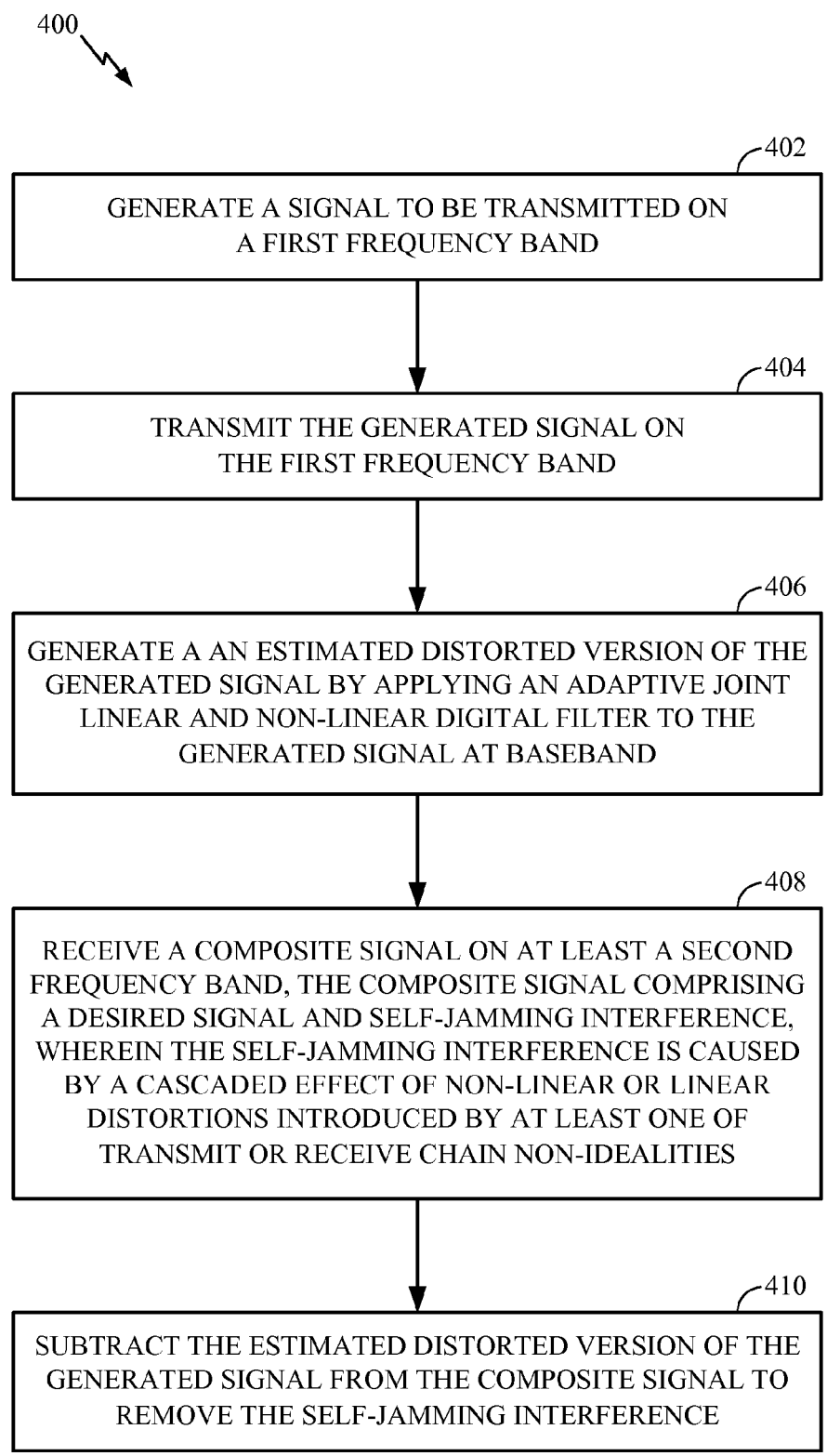
FIG. 4 illustrates example operations for jointly mitigating linear and non-linear self-jamming interference utilizing non-linear interference cancellation technique, in accordance with certain aspects of the present disclosure.

FIG. 4 illustrates example operations for jointly mitigating linear and non-linear self-jamming interference utilizing the proposed interference cancellation technique, in accordance with certain aspects of the present disclosure. While the operations below refer to a transmitter and a receiver, it should be understood that these components may be on the same apparatus. For example, the transmitter and receiver components described with respect to FIG. 4 may be the transmitter/receiver 222*a* of system 210.

At 402, the transmitter generates a signal to be transmitted on a first frequency band. At 404, the transmitter transmits the generated signal on the first frequency band. At 406, an adaptive digital filter generates an estimated distorted version of the generated signal by applying an adaptive joint linear and non-linear digital filter to the generated signal at baseband. As an example, the distorted version of the generated signal may be generated by applying a Volterra based filter to the generated signal at baseband. The Volterra based filter may include linear operators, non-linear operators, and delay elements. The coefficients of the linear and non-linear filter terms may be derived using a minimum mean square error (MSE) cost function (e.g., to minimize errors) or other functions. For example, the cost function may be minimized by utilizing a least mean square (LMS), a recursive least squares (RLS) algorithm, least squares (LS), a direct matrix inversion method, or any other methods. The linear portion of the filter is needed to estimate the linear channel distortion produced by the front-end filters.

The Volterra based filter may estimate second-order inter-modulation (IM2) distortion and/or 3rd harmonic distortion (H3D) and/or other higher or lower order harmonic distortions (e.g., H2D, H4D, and the like). For certain aspects, to apply Volterra based filter operators, polynomial generators may be applied to the generated signal at baseband to generate one or more Volterra states. Next, one or more weights may be applied to the generated one or more Volterra states, and sum of the one or more weighted Volterra states may be generated. For certain aspects, different polynomial orders may be applied to the generated signal at baseband, according to the non-linear effect under consideration.

At 408, the receiver may receive a composite signal on at least a second frequency band. The composite signal may include a desired signal and self-jamming interference. The self-jamming interference may be caused by a cascaded effect of non-linear or linear distortions, such as front-end filters, antenna to antenna propagation channel, or any type of linear channel introduced by at least one of transmit or receive chain non-idealities. At 410, the receiver subtracts the estimated distorted version of the generated signal from the composite signal to remove the self-jamming interference.

For certain aspects, polynomial generators may be applied to the generated signal at baseband by applying a generic p-th order polynomial expansion to the generated signal at baseband and generating p-th order inter-modulation (IMp) distortion and/or p-th order harmonic distortion (HpD).

It should be noted that for simplicity of explanations, the above operations are described for one transmit and one receive signal. However, these operations may be performed on any number of transmitted signals that are transmitted by one or more antennas and received by one or more antennas. The antennas may be located in a single or in multiple devices that may be in close proximity of each other.

Zero Intermediate Frequency (ZIF) architectures may offer significant advantages in terms of size and number of components with respect to a heterodyne scheme. However, the ZIF architecture may be vulnerable to non-linear effects produced by the receiver quadrature down-conversion chain when a strong jammer is present at its input. In this context, the jammer under consideration may be represented by the inevitable Tx leakage in the receiver chain resulting from limited filtering rejection.

Figure 5:
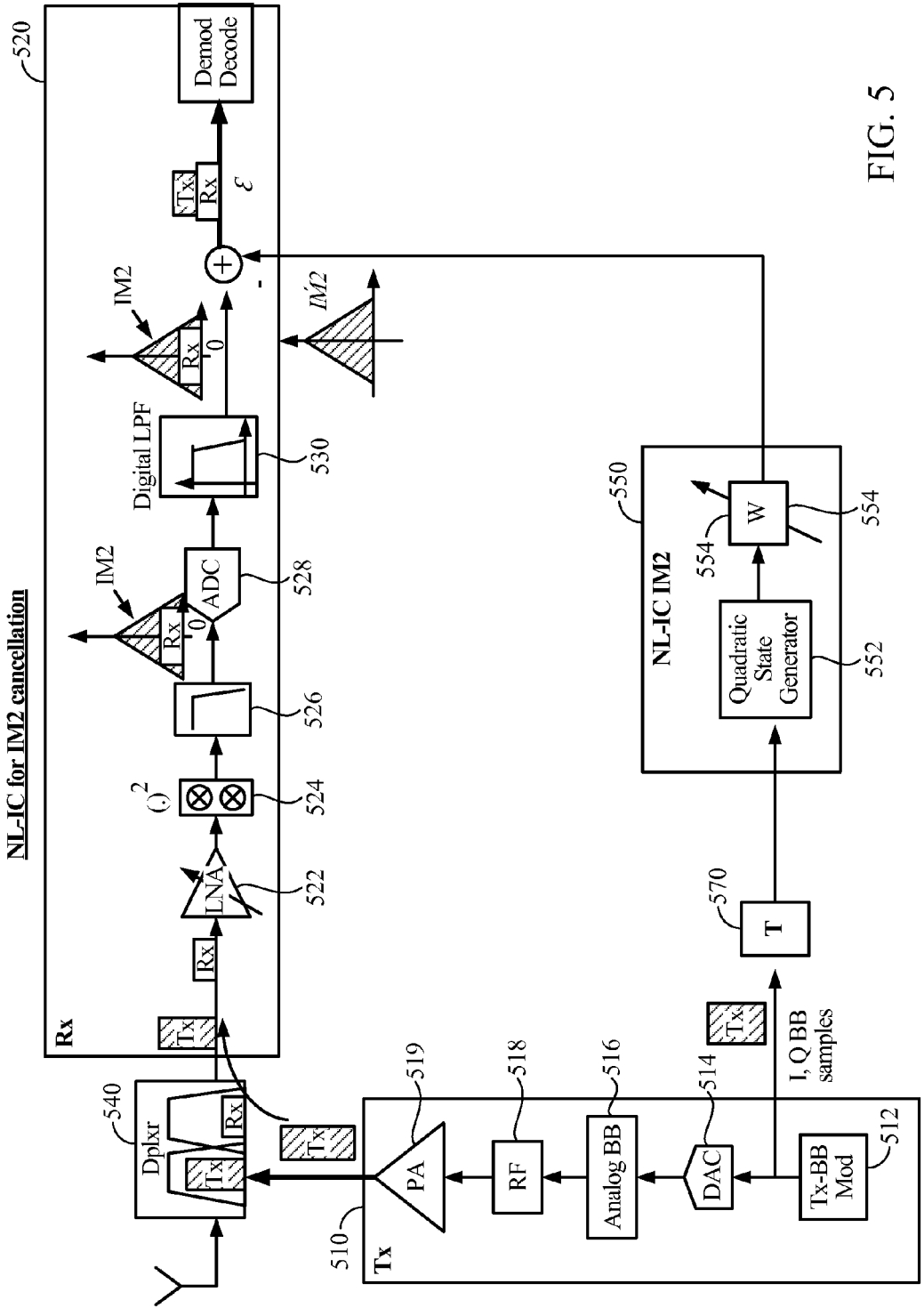
FIG. 5 illustrates an example architecture for cancellation of non-linear IM2 self-jamming distortion, in accordance with certain aspects of the present disclosure.

FIG. 5 illustrates an example architecture for cancellation of non-linear IM2 self-jamming distortion, in accordance with certain aspects of the present disclosure. As illustrated, the NL filter 550 may reconstruct the cascaded linear (e.g., duplexer stop-band response) plus nonlinear (e.g., IM2) distortion observed at the received base band signal in terms of minimum square error (MSE).

In this figure, a simplified version of a FDD ZIF architecture is illustrated with a transmitter chain 510 and a receiver chain 520 separated by a Duplexer 540. Starting form the bottom left, the Tx-BB digital samples 512 are converted by the digital to analog converter (DAC) 514 into analog continuous time signal 516 that is subsequently up-converted to carrier frequency by the mixer 518. After amplification provided by the PA 519, the Tx signal reaches the antenna via the Duplexer 540.

Given the limited Tx-Rx isolation provided by the Duplexer (50 dB in best case scenarios), a residual portion of the Tx power may leak thorough the stop-band into the Rx port. At the receiver, the composite signal (the leakage from the Tx signal plus the desired received signal) may pass through a low noise amplifier (LNA) 522, a quadrature mixer 524, a low-pass filter 526 to amplify, downconvert and filter the signal. An analog to digital converter (ADC) 528 may generate digital samples from the composite signal. The digital samples may go through a digital low pass filter 530 before being corrected by the output of the NL-IC 550.

It should be noted that power of the Tx leakage signal may be high enough to excite the non-linear behavior/characteristic of the receiver quadrature mixer 524. In particular, the 2nd order non-linearity may be responsible for the undesired down-conversion of the Tx leakage at DC irrespective of the Tx frequency, as described below.

The transmit baseband signal ($T_{X\_BB}$) may be represented as follows:

$$T_{X\_BB}(t) = x_I(t) + j \cdot x_Q(t) \tag{1}$$

where $x_I(t)$, $x_Q(t)$ are the in-phase and quadrature components of the transmitted signal, respectively.

The up-converted signal $T_{X\_RF}(t)$ may be represented as follows:

$$T_{X\_RF}(t) = x_I(t) \cdot \cos(\omega_{Tx} t) - x_Q(t) \cdot \sin(\omega_{Tx} t) \tag{2}$$

where $\omega_{Tx}$ is the transmit frequency.

A second order power may be applied to the up-converted signal as follows:

$$T_{X\_RF}^2 = [x_I^2(t) + x_Q^2(t)] + (x_I^2(t) - x_Q^2(t))\cos(2\omega_{Tx} t) - x_I(t) x_Q(t) \cdot \sin(2\omega_{Tx} t) \tag{3}$$

The first term in square brackets in the Eqn (3) may represent the DC-centered IM2D distortion illustrated with a triangle in FIG. 5. This distortion may overlap with the desired signal. Although the transmit frequency may be completely separated from Rx frequency, the non-linear effect may transform the transmitted signal to a co-channel interference for the Rx which can not be filtered out.

It should be noted that the co-channel interference may be even more pronounced if the utilized quadrature mixer is not calibrated (e.g., the quadrature mixer does not utilize the optimal I-Q digital to analog converter (DAC) calibration values). Mixer linearity may commonly be quantified in terms of IIP2 (2nd order input referred intercept point); the higher is the IIP2, the more linear is the mixer input-output characteristic.

Turning now to the proposed non-linear interference cancellation (NL-IC) scheme which is shown in box 550 in FIG. 5. In its simplest form, The NL-IC may be made of a non-linear function generator 552 followed by an adaptive weight generator 554. Throughout the present disclosure, the topology in 550 may be referred to as a non-linear (NL) filter. As noted above, the proposed NL-IC exploits the fact that the transmitted signal is known a priori. The NL filter mimics, in digital domain, the same non-linear distortions applied by the analog quadrature down-conversion to the Tx-leakage signal.

For certain aspects, the proposed NL-IC scheme may operate as follows: First, the transmit baseband (Tx BB) in phase (I) and Quadrature (Q) samples prior to DAC 514 are fed to a non-linear adaptive filter 550. The non-linear filter may reconstruct the same distortion order (for example, quadratic) as the one responsible for Tx self-jamming. The distorted version of the Tx BB signal may be scaled by variable complex coefficients to adjust for magnitude and phase prior to subtraction. The reconstructed IM2D distortion may then be subtracted from the composite signal made of desired Rx plus distortion prior to modem processing. The delay block 570 represents the fact that the Tx BB samples may need to be delayed to time-align them with the observed ones at the output of receiver chain.

It should be noted that the non-linear filter shown in FIG. 5 is used to convey the concept of NL-IC. In practice, the non-liner filter utilized for IM2D distortion cancellation (or cancellation of any other type of distortion) is more complicated as it needs to jointly reconstruct the linear distortion inferred to the Tx by the Duplexer non-flat stop band as well as the 2nd order non-linear distortion as explained later, and other types of self-jamming distortions.

Volterra Analysis for NL-IC

The problem of NL-IC can be formulated under the framework of non-linear system identification. A common way to represent the input-output characteristic of a purely nonlinear system may be by means of a power series expansion, such as Taylor series. The distorted output d for a discrete-time system may be given by the P- order power series, as follows:

$$d[k] = \sum_{p=0}^{P-1} a_p \cdot x^p[k] \qquad (4)$$

where $a_p$ may represent the coefficients of the series, and x[k] may represent the discrete-time input at time k.

When dealing with nonlinear system that introduce some delay in the output (e.g., have memory), an extension of the Taylor series known as Volterra series may be utilized. The Volterra series may be used to jointly model dispersion and non-linearity effects in a unified way.

With reference to a discrete time system with memory, a truncated P-order Volterra series may be written as follows:

$$d[k] = \qquad (5)$$
$$\sum_{m_1=0}^{M_1-1} h_1[m_1]x[k-m_1] + \sum_{m_1=0}^{M_2-1}\sum_{m_2=0}^{M_2-1} h[m_1, m_2]x[k-m_1]x[k-m_2] +$$
$$\ldots + \sum_{m_1=0}^{M_P-1}\sum_{m_2=0}^{M_P-1}\ldots\sum_{m_P=0}^{M_P-1} h[m_1, m_2, \ldots m_P]\prod_{i=1}^{M_P} x[k-m_i]$$

In Eqn (5), the first term which is the convolution of the input x[k] with a discrete linear time-invariant (LTI) system with impulse response h[m] may represent the linear component. The second term may represent a quadratic operator that may be applied to the first term. The last term may represent P-order non-linearity. $M_i$ may represent the memory span associated with the i-th term. The linear coefficients of the Volterra series may also be referred to as Kernels.

Figure 6:
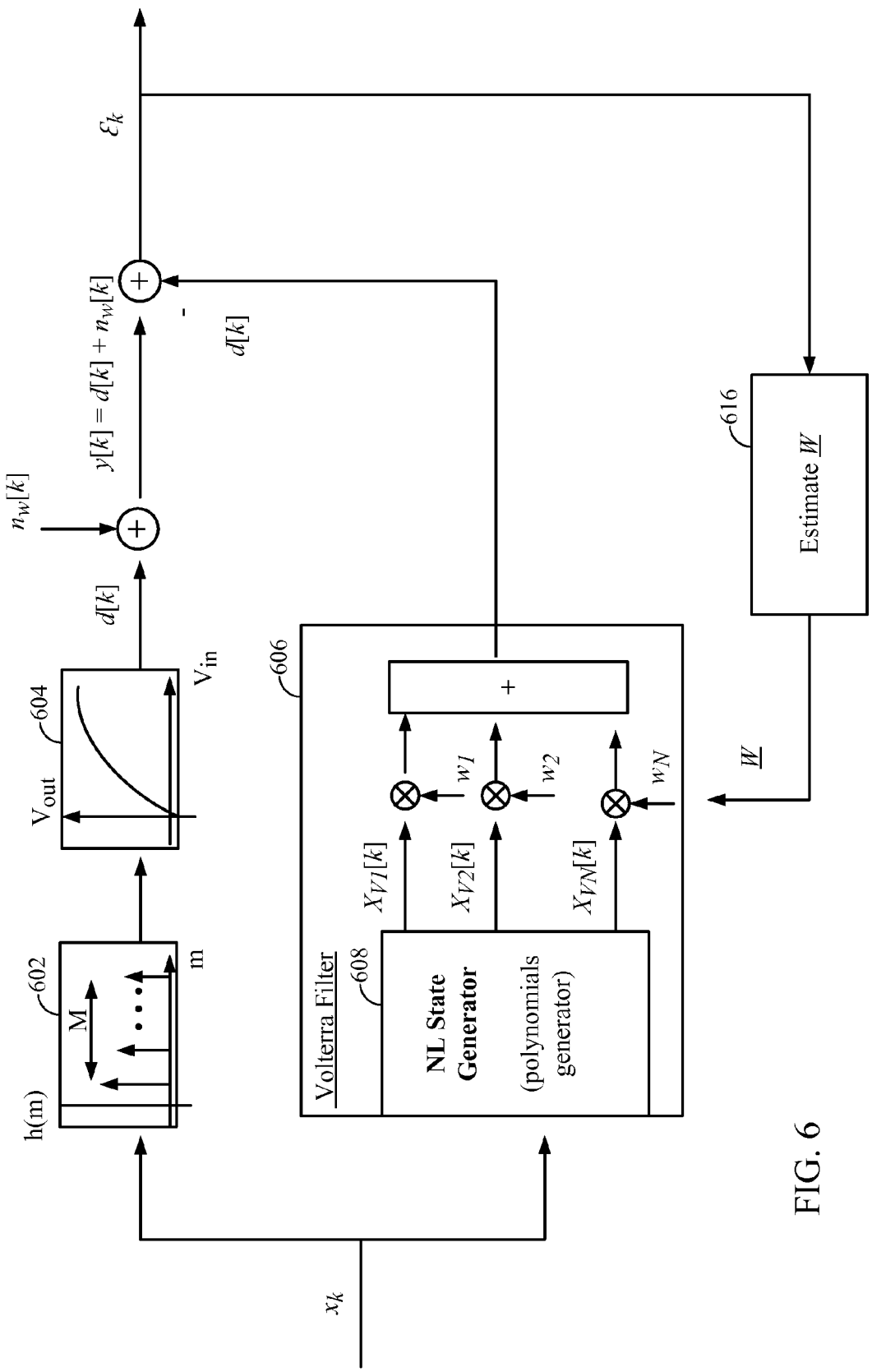
FIG. 6 illustrates a generic example of non-linear system identification where the unknown system exhibits a non-linear characteristic with memory effects, in accordance with certain aspects of the present disclosure.

The Volterra series can represent a wide variety of non-linear systems with smooth non-linear characteristic as the one represented in FIG. 6. FIG. 6 illustrates a generic example of system identification where the unknown system exhibits a non-linear characteristic with memory effects. The discrete time impulse response 602 preceding the NL-system 604 models the dispersive nature of the channel or equivalently the memory characteristic of the devices. The non-linear characteristic is then considered memory-less.

An independent disturbance $n_w[k]$ is generally present as additive noise to the target signal d[k], to form the observation signal y[k]. The filter 606 used for adaptive identification may be based on Volterra series. The filter 606 comprises a polynomial generator 608 and a bank of complex coefficients (W) to linearly weight each of the filter states prior to combining in the adder node. The expanded state of the filter is referred as Volterra state $\underline{X}_V$ to distinguish it from the concept of state used for linear filters.

As a high level description, the Volterra filter may operate as follows to cancel the nonlinear and linear interference. First, the Tx I-Q baseband samples $x_k$ may be pushed into the NL state generator block 608 of the Volterra-based filter. Next, output of the Volterra filter may be a weighted sum of the Volterra states by the coefficients $w_i$. The coefficients $w_i$ may be calculated in the weight estimation unit 616. In the third step, an error signal may be generated by subtracting the Volterra filter output a d̂[k] from the composite observation signal y[k] on the receiver path which is made of desired Rx plus distortion. Next, the residual error post cancellation may be fed back to iteratively adapt the weights of the Volterra filter using standard recursive algorithms for MSE minimization, such as but not limited to LMS, RLS, etc.

The interference cancellation steps explained above may help ensure a faithful reconstruction of the cascaded distortion effects produced on the Tx signal by the RF filter stopband as well as the receiver non-linearities, which can be subtracted out from the received composite signal.

As an example, assuming the memory span M=1, and limiting the non-linear order to P=3 for simplicity, the Volterra state vector $\underline{X}_V$ at time instant k may be written as follows:

$$\underline{X}_V[k] = [x_k^2\ x_k \cdot x_{k-1}\ x_{k-1}^2\ x_k^3\ x_{k-1}^3\ x_k^2 \cdot x_{k-1}\ x_k \cdot x_{k-1}^2]^T \qquad (6)$$

An example objective of adaptive system identification may be to compute the unknown coefficients $\underline{W}$ of the Volterra filter such that an appropriate cost function of the residual error is minimized. It should be noted that other objectives may also be used while estimating the unknown coefficients of the Volterra filter.

One of the great advantages of using a Volterra series is that the series expansion is a linear combination in the coefficients (kernels) of the Volterra state $\underline{X}_V$. Accordingly, this linear structure results in the mean square error surface being a quadratic function of the estimated weights, as encountered in linear adaptive filter theory. This property allows reusing well-known coefficient estimation criteria, such as minimum square error (MSE), or the like.

Estimation of the Coefficient Vector W

In order to estimate the coefficients, it may be assumed that the order of non-linearity as well as the memory span is known a priori. This assumption is not restrictive because in practical transceiver design, the non-linear order that generates spectral re-growth in the Rx channel can be predicted by harmonic analysis applied to Tx and Rx frequencies. For the memory span, the signal bandwidth may be a good indicator of whether memory is needed. More specifically, narrow band signals do not require memory in analogy with communication theory where frequency selective channels appear "almost" flat if the signal is narrow-band. Therefore, only few trials may be enough to estimate the required memory depth.

Formulating the estimation problem of the Volterra weights $\underline{w}_{opt}$ in terms of minimization of the mean-square error $E[\epsilon^2]$ may lead to the well-known Wiener solution, that may be expressed as follows:

$$\underline{w}_{opt} = \underline{R}_{X_v X_v}^{-1} \cdot \underline{r}_{X_v \cdot d} \qquad (7)$$

where $\underline{R}_{X_v X_v}$ may represent the auto-covariance matrix of the Volterra state $\underline{X}_V$, and $r_{X_v \cdot d}$ may represent the cross-correlation vector of $\underline{X}_V$ with the target signal d.

Calculation of an optimal weight W (in the MSE sense), may require knowledge of the Volterra input signal statistics of order 2P (in which P=1 for linear systems). In practice, it is rare to know these statistics a priori. Therefore, these quantities may be estimated from measurements of the observation and the inputs. For these reasons, the estimation problem may be formulated in terms of measured values of the observations and input signal realizations (e.g., using Least-Square (LS) method).

For certain aspects, the LS may select the coefficient vector W that minimizes sum J(N) of the squares of the error values, which may be written as follows:

$$J(N) = \frac{1}{N}\sum_{k=1}^{N} \varepsilon_k^2 \quad (8)$$

where the error values ϵ[k] may be written as follows:

$$\epsilon[k] = y[k] - \hat{d}[k] \quad (9)$$

The estimated distorted output $\hat{d}[k]$ may be written as follows:

$$\hat{d}[k] = \underline{X}_V^H \cdot \underline{w} \quad (10).$$

Equations (9) and (10) may be merged into Eqn (8), as follows:

$$J(N) = \frac{1}{N}\sum_{k=1}^{N} (y_k - \underline{X}_V^H \cdot \underline{w}) \quad (11)$$

The weights that minimize power of the error sequence are the ones that leave the residual error (post subtraction) uncorrelated with the Volterra Filter input, hence satisfy the following orthogonality condition:

$$\frac{1}{N}\sum_{k=1}^{N} \underline{X}_V[k](y_k - \underline{X}_V^H[k] \cdot \underline{w}) = 0 \quad (12)$$

Consequently, the least-square solution for Volterra-based filter may be written as follows:

$$\underline{w} = \hat{\underline{R}}_{X_V X_V}^{-1} \cdot \hat{\underline{r}}_{yX_V} \quad (13)$$

$$\hat{\underline{R}}_{X_V X_V} = \frac{1}{N}\sum_{k=1}^{N} \underline{X}_V[k] \cdot \underline{X}_V^H[k] \quad (14)$$

$$\hat{\underline{r}}_{yX_V} = \frac{1}{N}\sum_{k=1}^{N} y[k] \cdot \underline{X}_V[k] \quad (15)$$

Cancellation of the distortion may come as a consequence of orthogonality principle. In fact, reducing the correlation between the residual error and the Volterra state input ensures that the portion of the composite observation signal that is more correlated with the Volterra filter input has been removed (e.g., cancelled).

In the least-square solution, the statistics may then be estimated through time-average over a block of N samples. The choice of N may come as a trade-off between estimation accuracy and tracking While a larger value for N provides more averaging of the uncorrelated additive disturbance, it may impact tracking capability that is very important due to the inherent non-stationary nature of non-linear systems.

Volterra Filter Derivation for Joint Linear & NL IM2D IC

Figure 7:
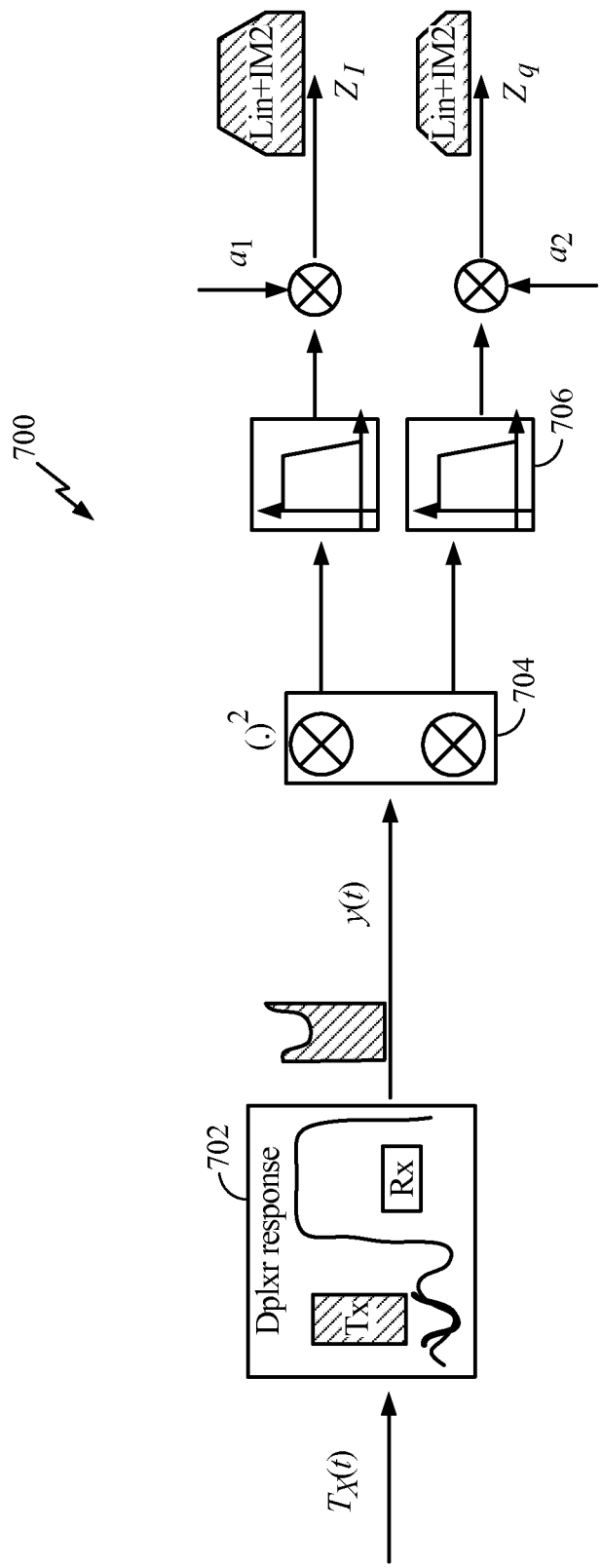
FIG. 7 illustrates an example pass-band model for cascaded linear and non-linear distortion effects induced by leaking of transmit signal, in accordance with certain aspects of the present disclosure.

As explained earlier, for certain aspects, a Volterra filter may be used to model the cascaded linear and non-linear distortions experienced by the transmitter leakage. The stop-band of the Duplexer may in general be non-flat. Therefore, the Tx leakage is linearly distorted prior to producing IM2D distortion at the mixer as shown in FIG. 7. Although these effects occur in the RF chain, an equivalent baseband model may be preferred as NL-IC adaptive reconstruction runs at baseband. Both of these distortions are adaptively and jointly estimated by the NL-IC which runs at baseband. The pass-band model depicted in FIG. 7 may be used as the starting point of the derivation.

FIG. 7 illustrates an example pass-band model for cascaded linear and non-linear distortion effects induced by leakage of transmit signal, in accordance with certain aspects of the present disclosure. As illustrated, the Tx leakage y(t) at the output of the Duplexer 702 may be obtained by performing convolution operation on the pass-band transmit signal $T_x(t)$ and the impulse response $h_{Dplxr}(t)$ of the Duplexer, as follows:

$$y(t) = T_x(t) * h_{Dplxr}(t) = Re\,al[\tilde{y}(t) \cdot e^{j\omega_c t}] \quad (16)$$

where $$\tilde{y}(t) = y_I(t) + j \cdot y_q(t) \quad (17)$$

and Real (.) represents real portion of a complex value, $\tilde{y}(t)$ represents the complex envelope of y(t), $y_1(t)$ and $y_q(t)$ represent in phase and quadrature portions of the complex envelope, and $\omega_c$ represents the carrier frequency.

The pass-band Tx signal $T_x(t)$ may be written as follows:

$$T_x(t) = Re\,al[\tilde{T}_x(t) \cdot e^{j2ct}] \quad (18)$$

where $$\tilde{T}_x(t) = T_{x\_I}(t) + j \cdot T_{x\_Q}(t) \quad (19)$$

and $\tilde{T}_x(t)$ represents the complex envelop of $T_x(t)$.

Similarly, the impulse response $h_{Dplxr}(t)$ of the duplexer may be written as follows:

$$h_{Dplx}(t) = Re\,al[\tilde{h}_{Dplx}(t) \cdot e^{j\omega_c t}] \quad (20)$$

The convolution operation in Eqn (16) may be re-written using the equivalent complex baseband representation, as follows:

$$\tilde{y}(t) = \tilde{T}_x(t) * \tilde{h}_{Dplx}(t) \quad (21)$$

In addition, the IM2D produced by the mixer 704 on the linearly distorted pass-band transmit leakage y(t) may be written as follows:

$$z(t) = y^2(t) \quad (22)$$

$$= y_I^2\left[\frac{1+\cos 2\omega_c t}{2}\right] + y_q^2\left[\frac{1+\cos 2\omega_c t}{2}\right] - y_I y_q \sin 2\omega_c$$

where pass-band representation of y(t) was used.

After the low-pass filters 706 in FIG. 7, the complex baseband IM2D distortion may be written as follows:

$$\tilde{z}(t) = z_I(t) + j \cdot z_q(t) = (a_1 + j \cdot a_2)LPF[z(t)] = a_1 \cdot |\tilde{y}(t)|^2 + j \cdot a_2 \cdot |\tilde{y}(t)|^2 \quad (23)$$

where $a_1$ and $a_2$ represent I-Q imbalances applied by the quadrature mixer which may be unknown a priori, and $|.|^2$ represents the square operation. The resulting equivalent baseband model, shown in FIG. 8, may be derived from Equations (21) and (23).

Figure 8:
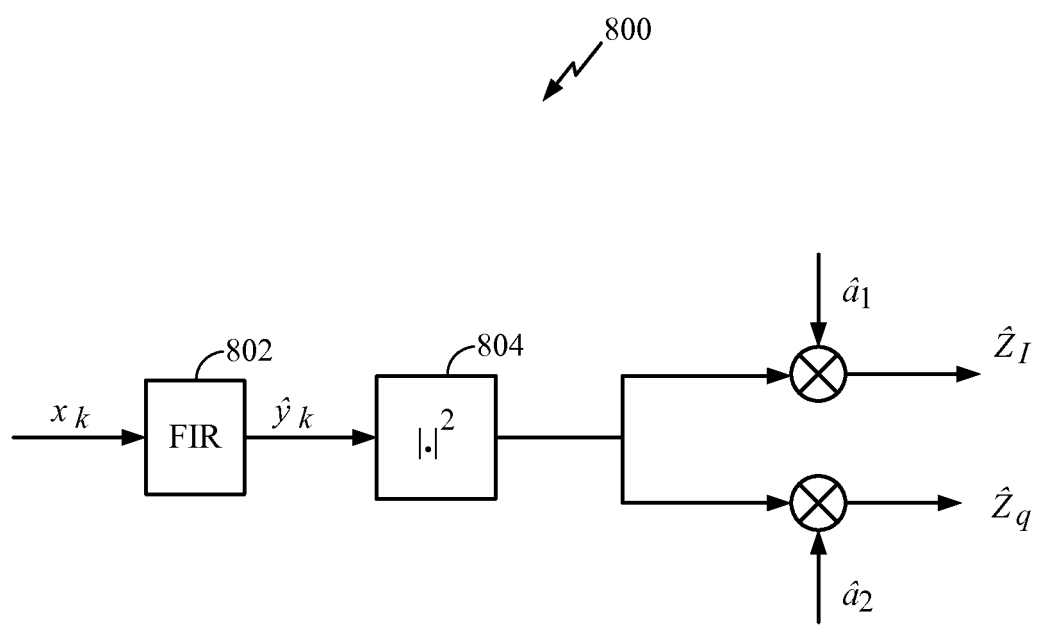
FIG. 8 illustrates an example equivalent baseband model of cascaded linear and non-linear distortion, in accordance with certain aspects of the present disclosure.

FIG. 8 illustrates an example equivalent baseband model of cascaded linear and non-linear distortion, in accordance with certain aspects of the present disclosure. As illustrated, the linear distortion generated by the duplexer may be modeled using a complex FIR filter 802, a square block 804 and some coefficients. The complex FIR filter 802 may have impulse response $\hat{h}(n) = \hat{\tilde{h}}_{Dplxr}(n)$ and $x(n) = \tilde{T}_x(n)$. The "$\hat{0}$" symbol denotes estimated quantities that are unknown.

The input-output relationship for the filter may be written as follows:

$$\hat{y}_k = \sum_{i=0}^{L-1} \hat{h}_i x_{k-i} \quad (24)$$

where L is the number of delay elements of the FIR or equivalently the memory span of the filter. From Equation (23), the estimated complex IM2D distortion may be written as follows:

$$\hat{z}_k = (\hat{a}_1 + j \cdot \hat{a}_2)|\hat{y}_k|^2 \quad (25)$$

Eqn (24) may be merged into Eqn (25) (e.g., assuming L=2), as follows:

$$\hat{z}_k = (\hat{a}_1 + j \cdot \hat{a}_2) \begin{pmatrix} |\hat{h}_1|^2 |x_k|^2 + 2\text{Re}[\hat{h}_1 \hat{h}_2^*(x_{k-1} \cdot x_k^*)] + \\ 2\text{Re}[\hat{h}_1 \hat{h}_3^*(x_{k-2} \cdot x_k^*)] + \\ +2\text{Re}[\hat{h}_2 \hat{h}_3^*(x_{k-2} \cdot x_{k-1}^*)] + \\ |\hat{h}_2|^2 |x_{k-1}|^2 + |\hat{h}_3|^2 |x_{k-2}|^2 \end{pmatrix} \quad (26)$$

where x* represents conjugate of x.

The Volterra state $\underline{X}_V$ utilized for NL-IC may be constructed from the input complex transmit samples $x_k$, as follows:

$$\underline{X}_V = [|x_k|^2 \; x_{k-1} \cdot x_k^* \; x_{k-2} \cdot x_k^* \; x_{k-2} \cdot x_{k-1}^* \; |x_{k-1}|^2 \; |x_{k-2}|^2]^T \quad (27)$$

where $[\;]^T$ denotes transpose.

All the unknown coefficients may be merged into the complex weight vector w to get a compact notation, as follows:

$$\hat{z}_k = \underline{w}^H \cdot \underline{X}_V \quad (28)$$

where $w^H$ denotes Hermitian of w. Therefore, with a single weight vector estimation, NL-IC reconstructs both linear and nonlinear cascaded distortion effects. Although the jointly linear and non-linear estimation algorithm is being derived for the case when the linear channel is represented by the front-end filter response, the teachings herein may be applicable to any type of linear channel distortion (e.g., antenna to antenna propagation), all of which fall within the scope of the present disclosure.

Link Level Simulation Results

In order to validate the proposed algorithm for IM2D NL-IC, a realistic set-up using commercial RTR-8600 Qualcomm RF chip is used. The IM2D extracted from the RTR-8600 through the acquisition chain is subsequently injected in a simple link-level simulator as additive interference. The simulator contains the NL-IC module configured for IM2D IC and features a simple OFDM modulator and demodulator for QPSK and 16 QAM to compute BER curves before and after interference cancellation using the proposed NL-IC method.

Link level simulations are conducted using Matlab. LTE Rel-8 waveforms are modeled for both UL and DL. The Volterra filter modeled in simulation utilizes P=2, M=2 to generate 6 quadratic polynomials to jointly reconstruct the linear distortion caused by the Duplexer as well as non-linear distortion produced by the mixer. The algorithm used for estimation of the coefficients is the LS which is invoked once every slot if intra-TTI (transport time interval) frequency hopping is enabled in the UL, otherwise, the LS algorithm is invoked every sub-frame. This update rate may be sufficient to track changes in the non-linear behavior of the channel as well as power control variations. The estimated weights are then used to multiply and combine 0.5 or 1 ms worth of samples of the Volterra state.

Figure 9:
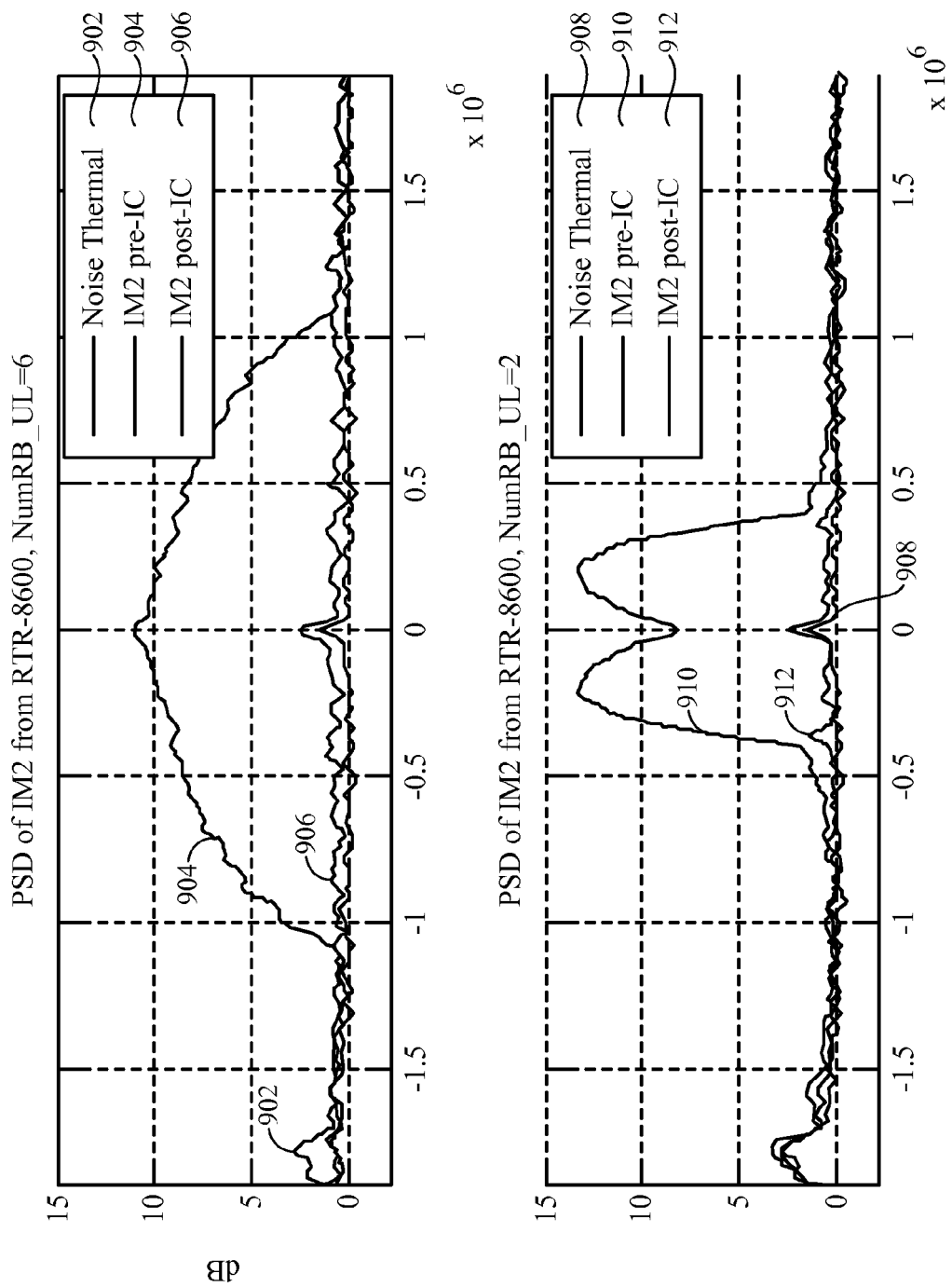
FIG. 9 illustrates example power spectral density (PSD) plots for second-order inter-modulation distortion (IM2D) before and after interference cancellation, in accordance with certain aspects of the present disclosure.

FIG. 9 illustrates example power spectral density (PSD) plots for IM2D distortion before and after interference cancellation, in accordance with certain aspects of the present disclosure. The PSD plots of the IM2D are illustrated with curves 904 and 910 measured at the output of the analog to digital converter (ADC) of the RTR-8600 receive path using the settings described earlier and maximum transmit power. The top and bottom subplots represent the case when six resource blocks (RBs) and two RBs are being transmitted in the UL, respectively. The reference for these measurements is represented by the thermal noise floors 902 and 908. The noise floor reference curves are generated by capturing the thermal noise from the RTR receiver path when no transmission occurs, hence when the transceiver is idle. The noise floor is arbitrarily set to 0 dB in the Figure for convenience.

In FIG. 9, the residual IM2D distortion plus thermal noise after performing the proposed interference cancellation technique using Volterra filters is represented by curves 906 and 912 for six and two RBs, respectively. As shown in the simulation results, the NL-IC scheme is capable of efficiently cancelling the IM2D distortion within 0.5 dB from the noise floor.

Figure 10:
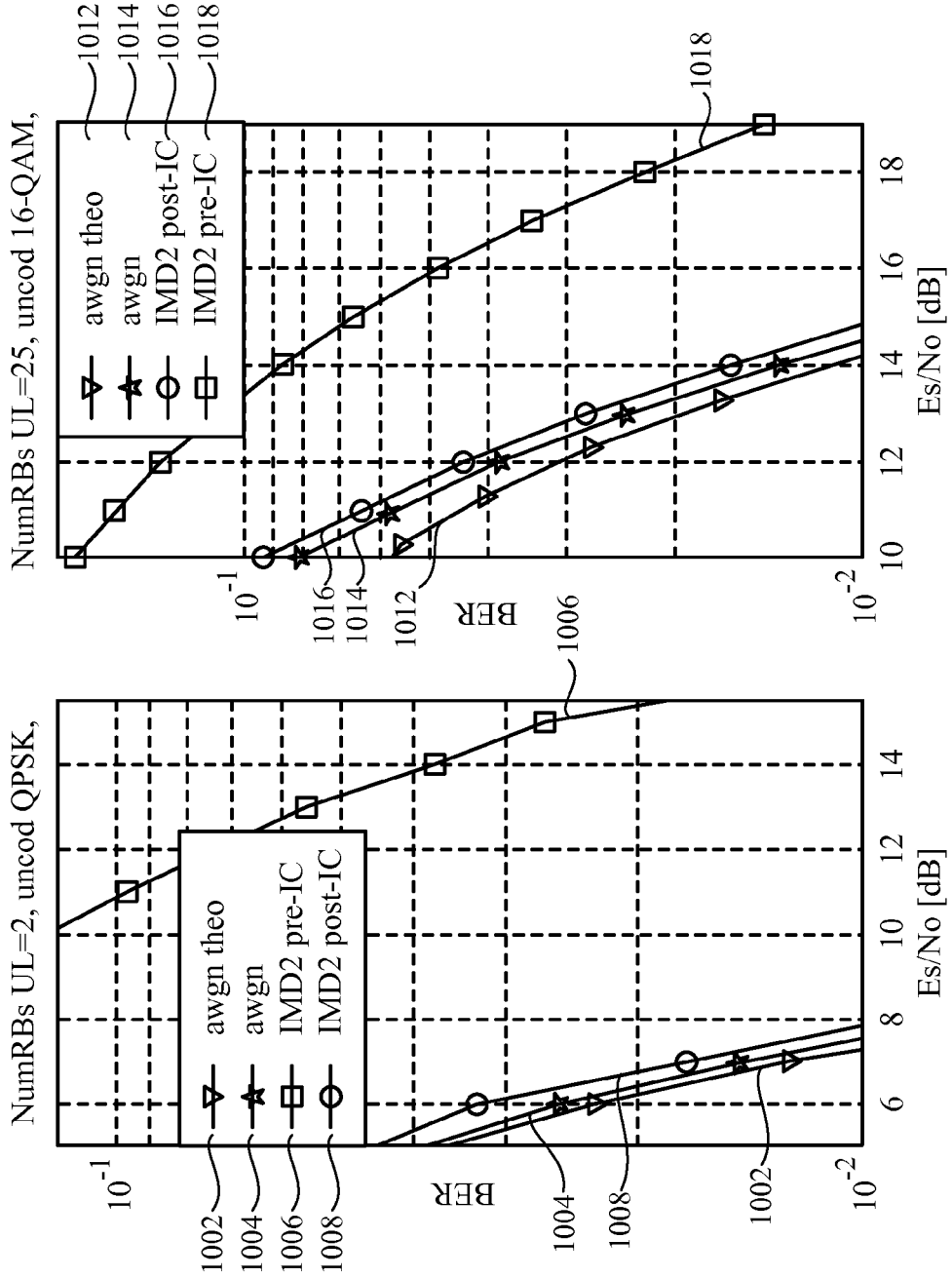
FIG. 10 illustrates uncoded bit error rate (BER) curves for QPSK with two resource blocks (RBs) and 16 QAM with 25 RBs, in accordance with certain aspects of the present disclosure.

FIG. 10 illustrates uncoded bit error rate (BER) curves for QPSK with two RBs and 16 QAM with 25 RBs, in accordance with certain aspects of the present disclosure. For this set of simulations, a simple link-level OFDM based communication system is modeled in Matlab with a transmitter and receiver representing the eNB and UE of LTE. The curves 1004 and 1014 represent the measured BER when only the thermal noise is injected in the simulator and is used to calibrate the per-tone SNR values (Es/No). The curves 1002 and 1012, represent the theoretical BER curves obtained from the Q(.) function for AWGN channels. Without changing these Rx scaling settings, the BER curves are produced again replacing the noise waveform with the composite IM2D plus noise extracted from the test-bench. To model the worst case scenario, the desired DL signal transmission is set to occupy the same RBs spanned by the IM2D such that each Rx tone is corrupted by the interference.

The curves 1006 and 1016 refer to the case without IC (e.g., NL-IC is bypassed). The curves 1008 and 1018 represent the BER values for the two cases (25 RBs and 2 RBs) when the proposed NL-IC is applied to the system. Note that for two RBs, the curve 1006 shows approximately 10 dB of de-sensing with respect to purely AWGN case which is consistent with the average interference over thermal (IoT) observed in the bottom PSD subplot. It can be seen that NL-IC restores the overall system performance within 0.7 dB of nominal condition for both cases with 2 and 25 RBs assignments.

Overview of B17 & B4 Carrier Aggregation (CA) in LTE-A

In LTE-A carrier aggregation is used to increase data rate of the users and improve spectrum utilization by reducing spectrum fragmentation. Aggregation of multiple radio channels occur either in the same band (e.g., non-contiguous intra-band aggregation) or across different bands (e.g., inter-band aggregation). The inter-band aggregation poses more challenges for radio design standpoint as it requires multiple RF chains operating simultaneously at frequencies that are well apart. One such type of configuration is frequency band 17 and frequency band 4.

Figure 11:
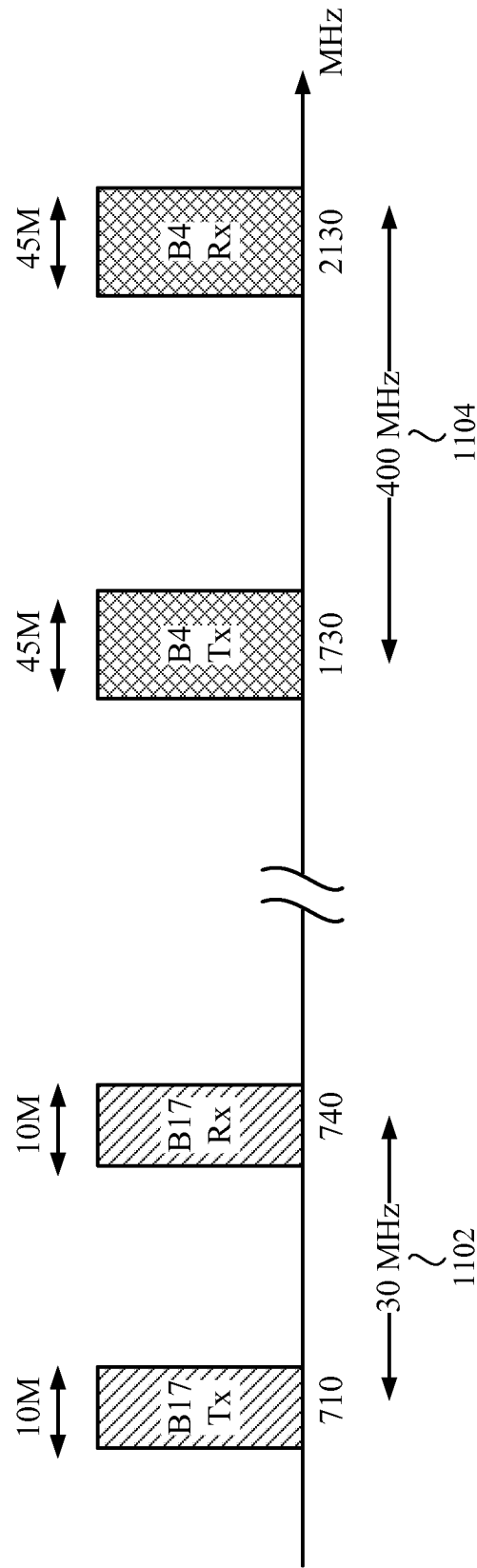
FIG. 11 illustrates carrier aggregation in frequency bands B17 and B4 in the Long Term Evolution-Advanced (LTE-A) standard.

FIG. 11 illustrates carrier aggregation in bands B17 and B4 in the LTE-A standard. As illustrated, the frequency band B17 1102, spans 10 MHz for Tx and 10 MHz for RX at center frequencies 710 and 740, respectively. The frequency band B4 1104, spans 45 MHz for Tx and 45 MHz for RX at center frequencies 1730 and 2130, respectively. LTE-A requires simultaneous reception of B17 and B4 channels with each radio channel experiencing antenna receive diversity. Transmission for each band occurs through a single antenna (primary) with optional transmit diversity.

Figure 12:
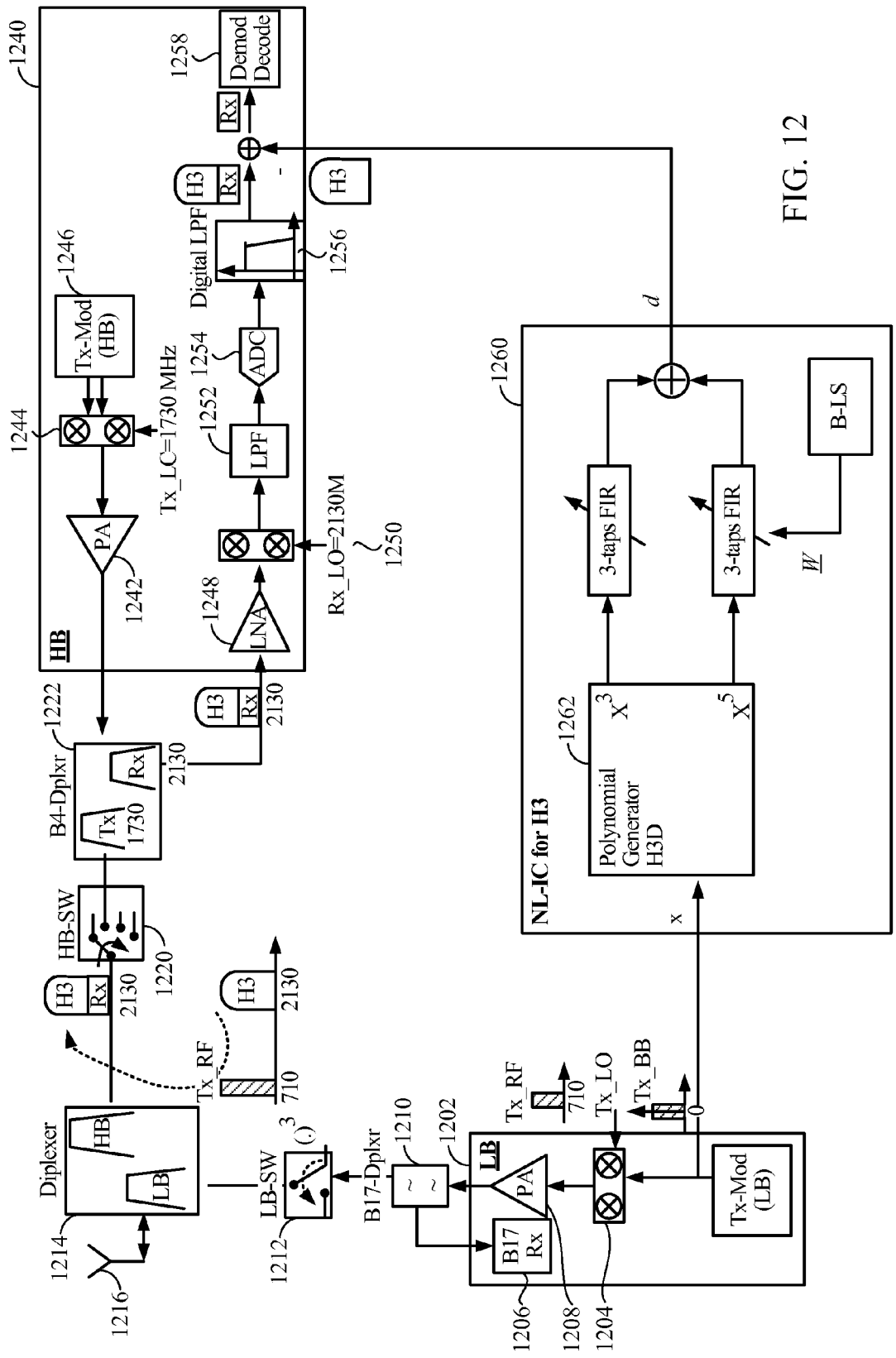
FIG. 12 illustrates an example high level radio frequency (RF) architecture diagram to support carrier aggregation, in accordance with certain aspects of the present disclosure.

FIG. 12 illustrates an example high level RF architecture diagram to support carrier aggregation, in accordance with certain aspects of the present disclosure. The left-most portion 1202 of the diagram represents a full duplex low-band (LB) RF chain with Tx_LO (e.g., low transmit frequency) tuned at 710 MHz. The Tx and Rx chains are separated by the B17 Duplexer 1210. The top portion of the diagram 1240 represents the high band (HB) RF chain with Rx_LO tuned at 2130. The low-band and high band paths are connected to a Diplexer 1214 which separates the low band from the high band to enable simultaneous transmission and reception at two different bands through a single antenna 1216 (Primary).

The secondary antenna (not shown for interest of space) is used for reception only to provide a degree of freedom in spatial dimension for diversity or MIMO processing.

After passing through the diplexer 1214, the high band portion of the received signal may pass through a high-band switch (HB-SW) 1220, B4 Duplexer 1222, low noise amplifier 11248, mixer 1250, low-pass filter 1252, analog to digital converter 1254 and the digital low-pass filter 1256 before being corrected by the output of the NL-IC1260.

Similarly, the low-band portion of the received signal may pass through low band switch (LB-SW) 1212, B17 duplexer 1210, and B17 receive chain 1206. Details of the B17 receive chain is not shown in the figure. Also, most of the blocks in FIG. 12 are similar to the blocks in FIG. 5, whose details are eliminated for brevity.

Problem Description for B17 & B4 CA

With reference to FIG. 12, the low-band Tx mixer 1204 up-converts the signal to carrier frequency at 710 MHz in the Tx-RF chain 1204 and further amplified by the PA 1208. After the Duplexer 1210, the signal is routed to the primary antenna 1216 by means of the switch 1212 and Diplexer 1214. Both the PA 1208 and the switch 1212 manifest a non-linear behavior for high transmit power levels. Focusing on the low-band switch 1212, 3rd order non-linearity of this device generates a spectral replica of the transmitted signal at 3×710=2130 at its output which is denoted "H3" in the diagram. These harmonic leaks through the diplexer 1214 and lands in the high-band Rx path, fully overlapping with the desired Rx signal centered at 2130 as well. At this point the Tx self-jamming H3D is a co-channel interference and can not simply be filtered out from the desired Rx. It is down-converted to base thus de-sensing the Rx path by for example, 10 -20 dBs.

For certain aspects, the proposed NL-IC scheme based on Volterra series may also be used to remove H3D, in which a specific sub-set of odd terms in the Volterra filter is selected. To ensure good digital reconstruction of the distortion, the 5th order power term may also be included. Based on the observed measurements, there may not be a need to consider higher order power terms as the incremental gains do not justify the increase in complexity. Once the polynomials for the Volterra filter have been selected, the same methodology proposed for IM2D cancellation can be applied for H3D, namely Tx sample spilling, digital reconstruction and subtraction.

Baseband Equivalent Volterra Filter for H3D-IC

Figure 13:
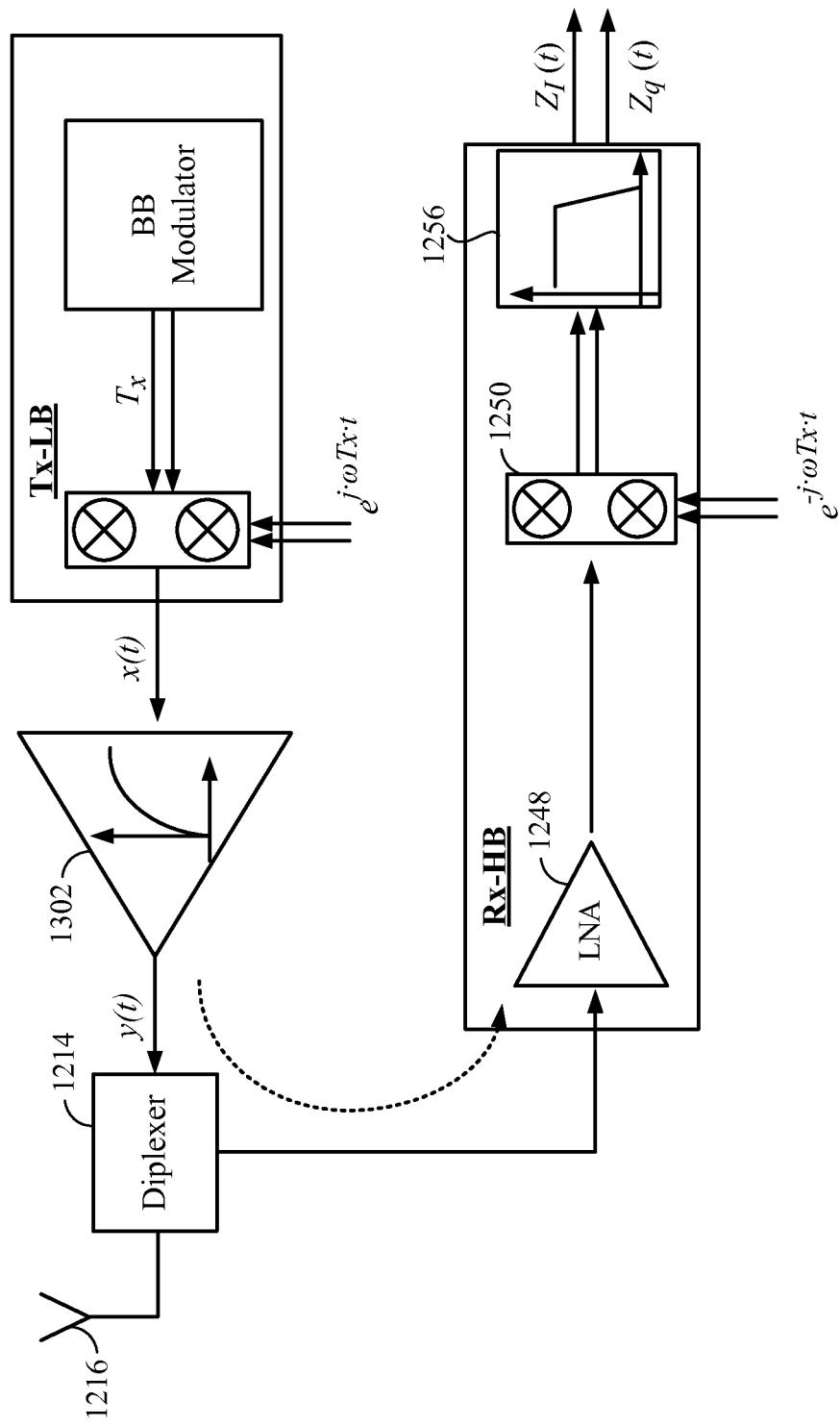
FIG. 13 illustrates an example model for third harmonic distortion (H3D) distortion, in accordance with certain aspects of the present disclosure.

For certain aspects an equivalent baseband Volterra model may be derived for H3D IC. FIG. 13 illustrates an example model for H3D distortion, in accordance with certain aspects of the present disclosure. Denoting the transmit complex envelope as A +jB, the pass-band transmit signal x(t) may be written as follows:

$$x(t) = A \cos(\omega_{Tx} t) - B \sin(\omega_{Tx} t)$$

Output y(t) of the non-linear device 1302 may be represented as a power series, as follows:

$$y(t) = a_1 \cdot x(t) + a_3 \cdot x^3(t) + a_5 \cdot x^5(t) +$$

The terms generated by the 3rd order power falling at $3 \cdot \omega_{Tx}$, may be written as follows:

$$x^3(t) = \ldots + (A^3 - 3A \cdot B^2) \cos(3\omega_{Tx} t) - (3A^2 B - B^3) \sin(3\omega_{Tx} t) +$$

After down-conversion at the high-band Rx side with $\omega_{Rx} = 3 \times \omega_{Tx}$ and low-pass filtering, the baseband I and Q components of the observed H3D distortion may be written as follows:

$$z_I = (A^3 - 3A \cdot B^2)$$

$$z_Q = (3A^2 B - B^3)$$

The equivalent baseband model for H3D is simply obtained by setting $x^3 = z_I + j^* z_q$ in the polynomial generator 1262 as illustrated in FIG. 12. To improve the cancellation accuracy, also the 5th order of IMD may be included as it contains a component that falls at $3 \cdot \omega_{Tx}$. Finally, the memory effects may be accounted for by augmenting the purely non-linear terms with a transversal delay line to recover delays. The overall 6 coefficients non-linear filter may be derived as shown in block 1260. The transversal delay line structure can also model linear distortion incurred by the H3D as it propagates through the filter stop-band.

Figure 14:
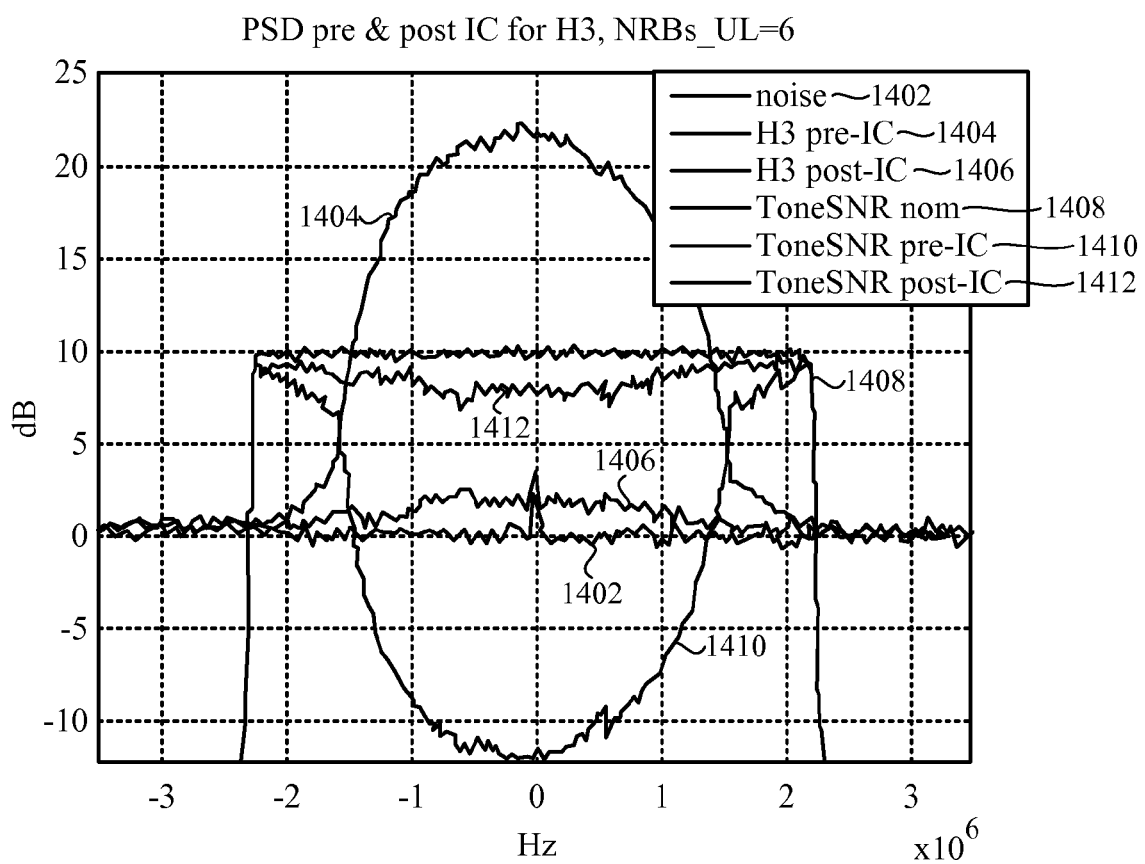
FIG. 14 illustrates an example simulation result for removing H3D distortion and per-tone signal to interference plus noise ratio (SINR) before and after interference cancellation, in accordance with certain aspects of the present disclosure.

FIG. 14 illustrates PSD plot of H3D distortion and per-tone SINR before and after IC, for the example with 6 RBs, in accordance with certain aspects of the present disclosure. The PSD plots illustrate H3D distortion that is captured at the output of the high-band receiver after down-conversion to baseband (curve 1404) and the residual distortion left after cancellation (curve 1406). As explained earlier, the reference noise 1402 is conveniently set to 0 dB. The DL signal of interest (curve 1408) is added to the composite noise plus distortion extracted from the RTR-8600 and appropriately scaled to have a per-tone SNR (Es/No) of 10 dB. Note that the DL signal overlaps almost entirely with the observed distortion. The per-tone $$\text{SINR}\left(\frac{S}{1 + N_o}\right)$$

pre-IC and post-IC are displayed with curves 1410 and 1412, respectively. It can be seen that also for H3D, the proposed scheme significantly reduces the high interference to a much smaller interference (e.g., an average RoT of 0.7 dB) in the signal occupied band.

The limited complexity of the adaptive non-linear filter (6-8 coefficients) combined with good performance measurements make this scheme a good candidate for hardware implementation.

For certain aspects, the NL-IC may include a frequency rotator to compensate frequency offset between the estimated distortion and the distortion present in the composite signal.

Figure 15:
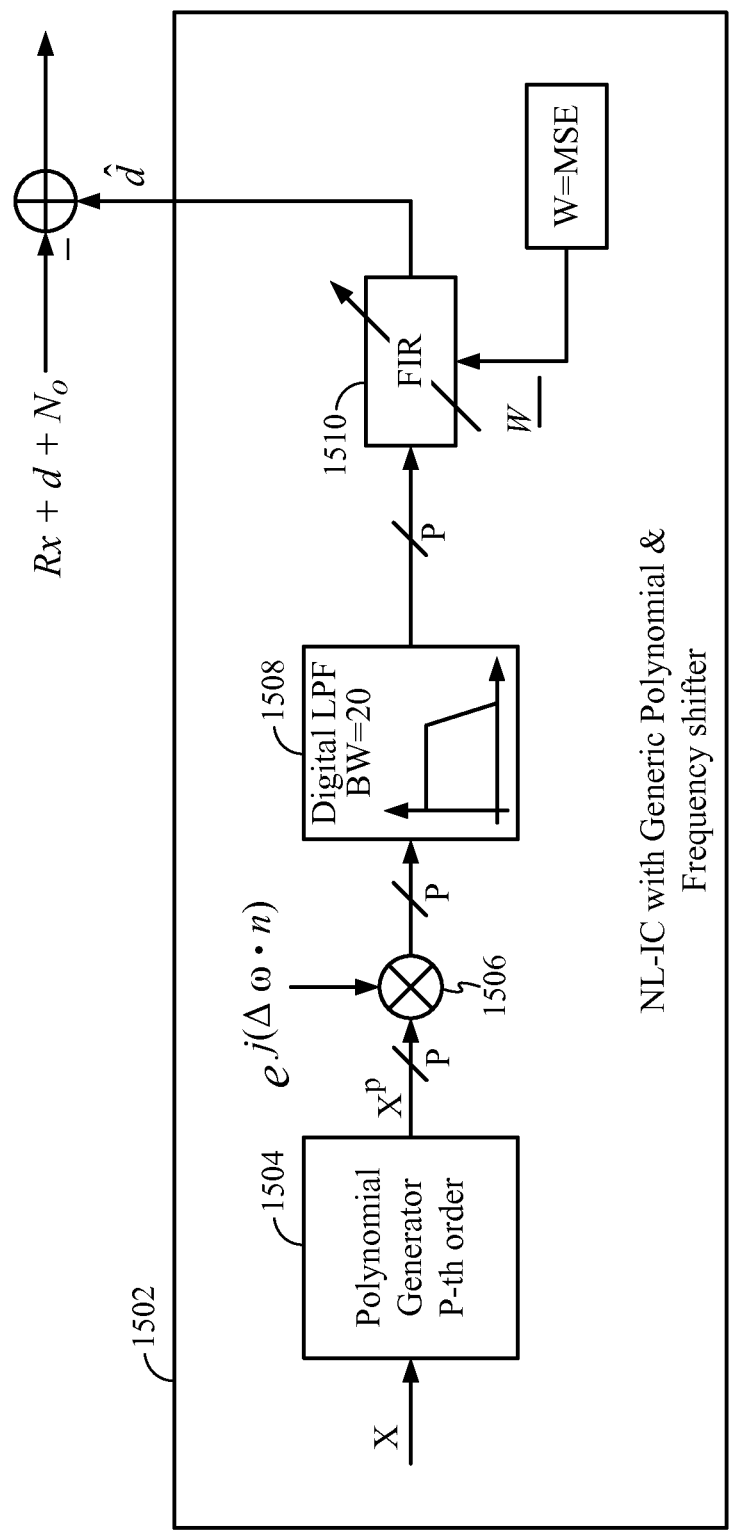
FIG. 15 illustrates an example of non-linear digital filter for cancelling self-jamming distortion, in accordance with certain aspects of the present disclosure.

FIG. 15 illustrates an example digital filter for cancelling self-jamming distortion, in accordance with certain aspects of the present disclosure. As illustrated, the digital filter (e.g., NL-IC) 1502 may include a p-th order polynomial generator

1504, a frequency rotator 1506, a digital low pass filter 1508 and an adaptive FIR filter 1510 with adjustable weights W. The p-th order polynomial generator 1504 may generate a generic polynomial expansion of order p based on the input signal x. The frequency rotator 1506 may shift frequency of each of the p outputs of the polynomial generator to align frequency of the estimated distortion d̂ with frequency of the received composite signal ($R_x+d+N_o$). It should be noted that the frequency shift Δω may be known a priori. The digital low-pass filter (LPF) 1508 may filter out unwanted frequencies (e.g., frequencies that are outside the receiver channel) before sending the samples to the adaptive FIR filter 1510. As an example, the channel bandwidth of the digital LPF may be set to 20 MHz for the LTE standard or to 5 MHz for the WCDMA standard.

In summary, a novel fully digital scheme (NL-IC) is described to mitigate Tx induced self-jamming effects produced by non-linear RF chains characteristic. The salient idea of the scheme is to process the available Tx digital samples to mimic the same non-linear mechanism that generates the "distorted" Tx replica (e.g., Tx-echo) in the receiver band. Therefore, certain aspects employ a Volterra-based filter to adaptively estimate, reconstruct and subtract (at the receiver) the Tx induced distortion.

The joint linear and non-linear cancellation scheme described herein provides the following advantages: a) Reduce calibration time (hence cost) by removing the need of quadrature mixer ad hoc tuning The resultant IM2D distortion produced by the mixer can be efficiently canceled by NL-IC in digital domain. b) Facilitate support of challenging LTE-A scenarios such as B17 (710 MHz Tx) and B4 (2130 Rx) which is particularly sensitive and vulnerable to H3D distortion, or B8 (e.g., 880 MHz) and B3 (e.g., 1800 MHz) which is vulnerable to H2D. It can also be applied to WAN/WLAN/GPS co-existence scenarios within the same device.

Algorithm validation conducted using authentic non-linear distortion confirmed the efficacy of the scheme to cancel both IM2D and H3D within an average 0.7 dB from noise floor. Given the DSP-centric nature of the proposed NL-IC scheme, it does not require any additional analog component and is actually transparent to the RF architecture. The proposed scheme can be flexibly configured through parameter changes in the polynomial generator block according to the specific non-linearity effect and technology under consideration, such as LTE, WCDMA, and the like.

It should be noted that although the examples in the present disclosure focused cancelling the self jamming interference of type IM2D and H3D distortions, one skilled in the art would appreciate that other types of self-jamming interference introduced by the transmitter and/or receiver chains (e.g., H2D, H4D, and the like) may also be mitigated utilizing the proposed joint linear and non-linear digital filter, as described herein, all of which falls within the scope of the present disclosure. In addition, although a digital filter based on Volterra series is explained as an example throughout the present disclosure, any other digital filter with p-order series expansion may be used to mitigate the self-jamming interference, all of which fall within the scope of the present disclosure.

It should be noted that the techniques described herein may be utilized in systems with multiple co-located transmitters and/or receivers. Different transmitters may transmit on the same or different carriers. In some cases, such transmitters may enable a single "multi-mode" device to support different radio access technologies (inter-RAT). Thus, multiple signals transmitted simultaneously by different co-located transmitters or multi-carrier transceiver may inter-modulate reciprocally due to non-linear RF effects thus producing cross jamming interference in a given receiver band.

For example, the self-jamming interference (e.g., p-order inter-modulation distortion) may be caused by a plurality of transmitter sources that are simultaneously active in the same device. In such cases, the techniques described herein may help mitigate the effects of interference caused by reciprocal inter-modulation when multiple transmitters are transmitting simultaneously, whether they may come from the same system such as LTE-A transmit carrier aggregation or co-existence of different systems such as WAN/WLAN/GPS. As another example, an estimated joint multiple receiver distortion may be computed by applying the adaptive joint linear and non-linear digital filter to the multiple transmitted signals at baseband.

For certain aspects, the estimated distortion may be computed by applying an adaptive joint linear and non-linear digital filter to the multiple transmitted signals at baseband.

Figure 16:
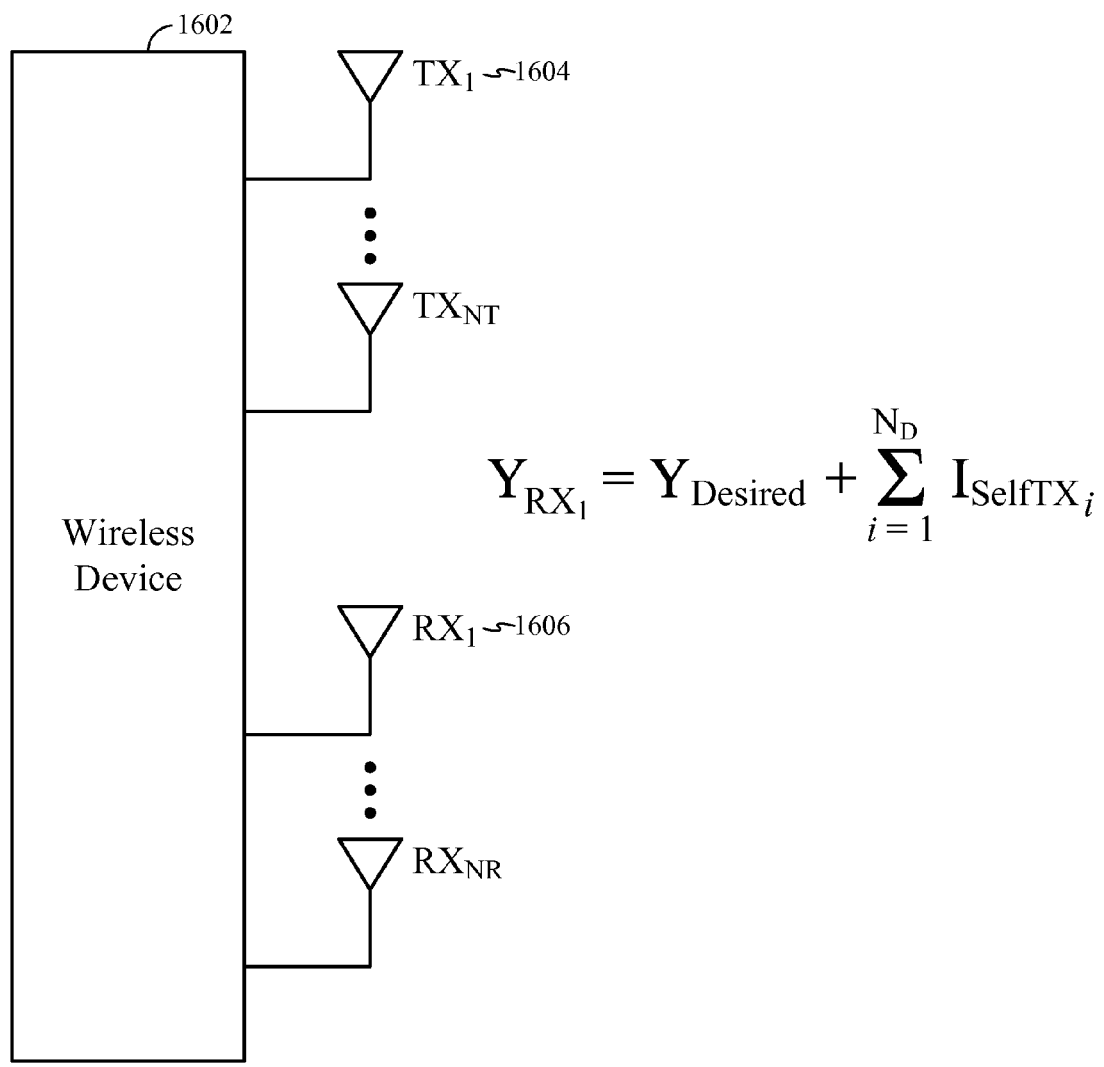
FIG. 16 illustrates an example wireless device with multiple co-located transmit and receive antennas, in accordance with certain aspects of the present disclosure.

FIG. 16 illustrates an example wireless device with multiple co-located transmit and receive antennas. As illustrated, the wireless device 1602 may have multiple transmit antennas 1604 (e.g., $TX_1$ through $TX_{NT}$) and multiple receive antennas 1606 (e.g., $RX_1$ through $RX_{NR}$). Each of the transmit antennas may transmit a signal on the same or different frequency bands. The receivers may receive a composite signal that may include a desired received signal (e.g., $y_{Desired}$) plus self-jamming interference caused by any of the transmitted signals. For example, the composite signal received by the first receive antenna ($RX_1$) may be written as follows:

$$y_{Rx_1} = y_{Desired} + \sum_{i=1}^{N_T} I_{SelfTX_i}$$

in which $I_{SelfTX_i}$ represents the self-jamming interference caused by the $i^{th}$ transmit antenna.

For certain aspects the transmitted and received signals may be wired or wireless signals. For example, the transmitted and received signals may be from different systems that co-exist in the same device.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for receiving may comprise a receiver such as the receiver unit 254 of the receiver system 250 shown in FIG. 2. Means for transmitting may comprise a transmitter, such as the transmitter unit 222. Means for generating, means for computing, means for subtracting and/or means for applying may comprise a processing system, which may include one or more processors, such as the processor 270 of the receiver system 250 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   generating a signal to be transmitted on a first frequency band;
   transmitting the generated signal on the first frequency band;
   computing an estimated distorted version of the generated signal by applying an adaptive joint linear and non-linear digital filter to the generated signal at baseband;
   receiving a composite signal on at least a second frequency band, the composite signal comprising a desired signal and self-jamming interference, wherein the self-jamming interference is caused by a cascaded effect of at least one of non-linear or linear distortions introduced by at least one of transmit or receive chain non-idealities; and
   subtracting the estimated distorted version of the generated signal from the composite signal to remove the self-jamming interference.

2. The method of claim 1, wherein computing the estimated distorted version of the generated signal comprises:
   applying a Volterra based filter to the generated signal at baseband, wherein the Volterra based filter comprises linear operators, non-linear operators, and delay elements.

3. The method of claim 2, wherein the Volterra based filter estimates second-order inter-modulation (IM2) distortion.

4. The method of claim 2, wherein the Volterra based filter estimates $3^{rd}$ harmonic distortion (H3D).

5. The method of claim 2, wherein applying the Volterra based filter comprises:
   applying polynomial generators to the generated signal at baseband to generate one or more Volterra states;
   applying one or more weights to the generated one or more Volterra states; and
   generating a sum of the one or more weighted Volterra states.

6. The method of claim 5, wherein applying the polynomial generators to the generated signal at baseband comprises:
   applying delay to the generated signal at baseband or to the Volterra states.

7. The method of claim 5, wherein applying the polynomial generators to the generated signal at baseband comprises:
   applying a generic p-th order polynomial expansion to the generated signal at baseband; and
   generating at least one of p-th order inter-modulation (IMp) distortion or p-th order harmonic distortion (HpD).

8. The method of claim 5, further comprising:
   generating the one or more weights by minimizing a cost function.

9. The method of claim 8, wherein the cost function is minimized by utilizing a least mean square (LMS), a recursive least squares (RLS) algorithm, least squares (LS) or a direct matrix inversion method, or other mean squared error methods.

10. The method of claim 1, wherein the self-jamming interference is caused by a plurality of transmitter sources that are simultaneously active in an apparatus, and the self-jamming interference comprises a p-order inter-modulation distortion where p>1 and m-order harmonic distortion where m>1.

11. The method of claim 1, wherein the transmitted and received signals are wireless signals.

12. The method of claim 11, wherein the transmitted and received signals are from different systems that co-exist in the same apparatus.

13. The method of claim 1, wherein the transmitted and received signals are wired signals.

14. The method of claim 13, wherein the transmitted and received signals are from different systems that co-exist in the same apparatus.

15. The method of claim 1, wherein multiple signals transmitted simultaneously by different co-located transmitters or a multi-carrier transceiver inter-modulate reciprocally due to non-linear radio frequency (RF) effects thus producing cross jamming interference in a given receiver band.

16. The method of claim 15, wherein the estimated distorted version of the generated signal is computed by applying the adaptive joint linear and non-linear digital filter to the multiple transmitted signals at baseband.

17. The method of claim 15, wherein an estimated joint multiple receiver distortion is computed by applying the adaptive joint linear and non-linear digital filter to the multiple transmitted signals at baseband.

18. The method of claim 1, wherein the adaptive digital filter comprises linear coefficients and delay to estimate purely linear distortion.

19. The method of claim 1, wherein the adaptive digital filter comprises a frequency rotator to compensate frequency offset between the estimated distorted version of the generated signal and the self-jamming interference present in the composite signal.

20. An apparatus, comprising:
means for generating a signal to be transmitted on a first frequency band;
means for transmitting the generated signal on the first frequency band;
means for computing an estimated distorted version of the generated signal by applying an adaptive joint linear and non-linear digital filter to the generated signal at baseband;
means for receiving a composite signal on at least a second frequency band, the composite signal comprising a desired signal and self-jamming interference, wherein the self-jamming interference is caused by a cascaded effect of at least one of non-linear or linear distortions introduced by at least one of transmit or receive chain non-idealities; and
means for subtracting the estimated distorted version of the generated signal from the composite signal to remove the self-jamming interference.

21. The apparatus of claim 20, wherein the means for computing the estimated distorted version of the generated signal comprises:
means for applying a Volterra based filter to the generated signal at baseband, wherein the Volterra based filter comprises linear operators, non-linear operators, and delay elements.

22. The apparatus of claim 21, wherein the Volterra based filter estimates second-order inter-modulation (IM2) distortion.

23. The apparatus of claim 21, wherein the Volterra based filter estimates $3^{rd}$ harmonic distortion (H3D).

24. The apparatus of claim 21, wherein the means for applying the Volterra based filter comprises:
means for applying polynomial generators to the generated signal at baseband to generate one or more Volterra states;
means for applying one or more weights to the generated one or more Volterra states; and
means for generating a sum of the one or more weighted Volterra states.

25. The apparatus of claim 24, wherein the means for applying the polynomial generators to the generated signal at baseband comprises:
means for applying delay to the generated signal at baseband or to the Volterra states.

26. The apparatus of claim 24, wherein the means for applying the polynomial generators to the generated signal at baseband comprises:
means for applying a generic p-th order polynomial expansion to the generated signal at baseband; and
means for generating at least one of p-th order inter-modulation (IMp) distortion or p-th order harmonic distortion (HpD).

27. The apparatus of claim 24, further comprising:
means for generating the one or more weights by minimizing a cost function.

28. The apparatus of claim 27, wherein the cost function is minimized by utilizing a least mean square (LMS), a recursive least squares (RLS) algorithm, least squares (LS) or a direct matrix inversion method, or other mean squared error methods.

29. The apparatus of claim 20, wherein the self-jamming interference is caused by a plurality of transmitter sources that are simultaneously active in an apparatus, and the self-jamming interference comprises a p-order inter-modulation distortion where p>1 and m-order harmonic distortion where m>1.

30. The apparatus of claim 20, wherein the transmitted and received signals are wireless signals.

31. The apparatus of claim 30, wherein the transmitted and received signals are from different systems that co-exist in the same apparatus.

32. The apparatus of claim 20, wherein the transmitted and received signals are wired signals.

33. The apparatus of claim 32, wherein the transmitted and received signals are from different systems that co-exist in the same apparatus.

34. The apparatus of claim 20, wherein multiple signals transmitted simultaneously by different co-located transmitters or a multi-carrier transceiver inter-modulate reciprocally due to non-linear radio frequency (RF) effects thus producing cross jamming interference in a given receiver band.

35. The apparatus of claim 34, wherein the estimated distorted version of the generated signal is computed by applying the adaptive joint linear and non-linear digital filter to the multiple transmitted signals at baseband.

36. The apparatus of claim 34, wherein an estimated joint multiple receiver distortion is computed by applying the adaptive joint linear and non-linear digital filter to the multiple transmitted signals at baseband.

37. The apparatus of claim 20, wherein the adaptive digital filter comprises linear coefficients and delay to estimate purely linear distortion.

38. The apparatus of claim 20, wherein the adaptive digital filter comprises a frequency rotator to compensate frequency offset between the estimated distorted version of the generated signal and the self-jamming interference present in the composite signal.

39. A computer-program product, comprising a non-transitory computer readable medium having instructions stored thereon, the instructions being executable by one or more processors and the instructions comprising:
- instructions for generating a signal to be transmitted on a first frequency band;
- instructions for transmitting the generated signal on the first frequency band;
- instructions for computing an estimated distorted version of the generated signal by applying an adaptive joint linear and non-linear digital filter to the generated signal at baseband;
- instructions for receiving a composite signal on at least a second frequency band, the composite signal comprising a desired signal and self-jamming interference, wherein the self-jamming interference is caused by a cascaded effect of at least one of non-linear or linear distortions introduced by at least one of transmit or receive chain non-idealities; and
- instructions for subtracting the estimated distorted version of the generated signal from the composite signal to remove the self-jamming interference.

40. An apparatus, comprising:
- at least one processor configured to:
  - generate a signal to be transmitted on a first frequency band,
  - transmit the generated signal on the first frequency band,
  - compute an estimated distorted version of the generated signal by applying an adaptive joint linear and non-linear digital filter to the generated signal at baseband,
  - receive a composite signal on at least a second frequency band, the composite signal comprising a desired signal and self-jamming interference, wherein the self-jamming interference is caused by a cascaded effect of at least one of non-linear or linear distortions introduced by at least one of transmit or receive chain non-idealities, and
  - subtract the estimated distorted version of the generated signal from the composite signal to remove the self-jamming interference; and
- a memory coupled to the at least one processor.

\* \* \* \* \*